US012608726B2

(12) United States Patent
Kang et al.

(10) Patent No.: US 12,608,726 B2
(45) Date of Patent: Apr. 21, 2026

(54) SYSTEMS AND METHODS FOR PROVIDING ADVERTISING SERVICES TO DEVICES WITH A CUSTOMIZED ADAPTIVE USER EXPERIENCE BASED ON ADAPTIVE ALGORITHMS

(71) Applicant: VUNGLE, INC., San Francisco, CA (US)

(72) Inventors: Daniel Kang, San Francisco, CA (US); Ben Bear, San Francisco, CA (US)

(73) Assignee: VUNGLE, Inc., San Francisco, CA (US)

( * ) Notice: Subject to any disclaimer, the term of this patent is extended or adjusted under 35 U.S.C. 154(b) by 0 days.

(21) Appl. No.: 18/424,346

(22) Filed: Jan. 26, 2024

(65) Prior Publication Data

US 2024/0242246 A1     Jul. 18, 2024

Related U.S. Application Data

(60) Division of application No. 17/382,085, filed on Jul. 21, 2021, now Pat. No. 11,922,459, which is a
(Continued)

(51) Int. Cl.
*G06Q 30/00* (2023.01)
*G06Q 30/0207* (2023.01)
(Continued)

(52) U.S. Cl.
CPC ..... *G06Q 30/0255* (2013.01); *G06Q 30/0224* (2013.01); *G06Q 30/0242* (2013.01);
(Continued)

(58) Field of Classification Search
CPC ........... G06Q 30/0255; G06Q 30/0224; G06Q 30/0242; G06Q 30/0267; G06Q 30/0269; G06Q 30/0275
See application file for complete search history.

(56) References Cited

U.S. PATENT DOCUMENTS 10,699,309 B2     6/2020  Kang
10,740,797 B2 *   8/2020  Li ...................... G06Q 30/0261
(Continued)

FOREIGN PATENT DOCUMENTS

CN        101253524  A        8/2008
CN        101536025  A        9/2009
(Continued)

OTHER PUBLICATIONS

"Ad-me: wireless advertising adapted to the user location, device and emotions". IEEE. 2004. (Year: 2004).*
(Continued)

*Primary Examiner* — Maria V Vanderhorst
(74) *Attorney, Agent, or Firm* — Jaffery Watson Hamilton & DeSanctis LLP

(57)        ABSTRACT

Methods and systems are described for providing advertising services to devices with a customized adaptive user experience based on adaptive algorithms. In one embodiment, a system includes a storage medium to store one or more software programs and an adaptive decision unit coupled to the storage medium. The adaptive decision unit includes or is coupled to processing logic that is configured to execute instructions of at least one adaptive decision algorithm to obtain data for different variables including at least two of an advertisement (ad) engagement history for a user, application (app) engagement history for the user, and in-app purchase engagement history for the user when making an ad selection decision. The at least one adaptive decision algorithm determines an ad selection decision for at least one relevant ad or ad content served in an engaging manner to a device of the user.

23 Claims, 13 Drawing Sheets

Related U.S. Application Data continuation of application No. 14/677,945, filed on Apr. 2, 2015, now Pat. No. 11,100,536.

(60) Provisional application No. 62/089,195, filed on Dec. 8, 2014.

(51) Int. Cl.
*G06Q 30/0242* (2023.01)
*G06Q 30/0251* (2023.01)
*G06Q 30/0273* (2023.01)
*G05B 19/418* (2006.01)

(52) U.S. Cl.
CPC ..... *G06Q 30/0267* (2013.01); *G06Q 30/0269* (2013.01); *G06Q 30/0275* (2013.01)

(56) References Cited

U.S. PATENT DOCUMENTS

| | | | |
|---|---|---|---|
| 11,100,536 | B2 | 8/2021 | Kang |
| 11,127,037 | B2 | 9/2021 | Kang |
| 11,205,193 | B2 | 12/2021 | Kang |
| 11,922,459 | B2 | 3/2024 | Kang |
| 2003/0004787 | A1 | 1/2003 | Tripp |
| 2005/0289005 | A1 | 12/2005 | Ferber et al. |
| 2006/0069616 | A1 | 3/2006 | Bau |
| 2007/0072676 | A1 | 3/2007 | Baluja |
| 2008/0010372 | A1 | 1/2008 | Khedouri et al. |
| 2009/0106104 | A1 | 4/2009 | Upendran et al. |
| 2009/0112708 | A1 | 4/2009 | Barhydt et al. |
| 2009/0185619 | A1 | 7/2009 | Taleb et al. |
| 2010/0023966 | A1 | 1/2010 | Shahraray et al. |
| 2010/0082440 | A1 | 4/2010 | Vaidyanathan et al. |
| 2011/0022464 | A1 | 1/2011 | Dunn et al. |
| 2011/0066495 | A1 | 3/2011 | Ayloo et al. |
| 2011/0066497 | A1 | 3/2011 | Gopinath et al. |
| 2011/0231227 | A1 | 9/2011 | Temares et al. |
| 2011/0264522 | A1 | 10/2011 | Chan et al. |
| 2011/0295683 | A1 | 12/2011 | Mak |
| 2012/0042253 | A1 | 2/2012 | Priyadarshan et al. |
| 2012/0233631 | A1* | 9/2012 | Geshwind ........ H04N 21/44016 |
| | | | 725/35 |
| 2013/0042015 | A1 | 2/2013 | Begen et al. |
| 2013/0073398 | A1 | 3/2013 | Levy |
| 2013/0132854 | A1 | 5/2013 | Raleigh et al. |
| 2013/0211910 | A1 | 8/2013 | Yerli |
| 2013/0325573 | A1 | 12/2013 | Park et al. |
| 2014/0040008 | A1 | 2/2014 | Belani et al. |
| 2014/0168277 | A1 | 6/2014 | Ashley et al. |
| 2014/0201063 | A1 | 7/2014 | Snell et al. |
| 2014/0222587 | A1 | 8/2014 | Feldman |
| 2015/0012344 | A1 | 1/2015 | Guinn et al. |
| 2015/0039443 | A1 | 2/2015 | Soon-Shiong |
| 2015/0143496 | A1 | 5/2015 | Thomas et al. |
| 2015/0242755 | A1 | 8/2015 | Gross |
| 2015/0302458 | A1 | 10/2015 | Dides et al. |
| 2016/0027066 | A1 | 1/2016 | Sachson et al. |

FOREIGN PATENT DOCUMENTS

| | | | |
|---|---|---|---|
| CN | 102473266 | A | 5/2012 |
| EP | 3230939 | A1 | 10/2017 |
| WO | 2008060821 | A1 | 5/2008 |
| WO | 2011011387 | A2 | 1/2011 |
| WO | 2016094426 | A1 | 6/2016 |
| WO | 2016094427 | A1 | 6/2016 |
| WO | 2016094428 | A1 | 6/2016 |

OTHER PUBLICATIONS

"Infrastructure support for mobile collaboration". IEEE. 2004. (Year: 2004).*

Advisory Action, U.S. Appl. No. 14/677,943, Jan. 31, 2018, pp. 1-6, USPTO.
Communication pursuant to Article 94(3) EPC, EP Application No. 15866881.4, Mar. 25, 2020, pp. 1-7, EPO.
Extended European Search Report, EP Application No. 15866881.4, Mar. 16, 2018, pp. 1-8, EPO.
Final Office Action, U.S. Appl. No. 14/677,943, Nov. 1, 2017, pp. 1-16, USPTO.
Final Office Action, U.S. Appl. No. 14/677,944, Jan. 25, 2018, pp. 1-19, USPTO.
Final Office Action, U.S. Appl. No. 14/677,944, May 16, 2019, pp. 1-15, USPTO.
Final Office Action, U.S. Appl. No. 14/677,945, Dec. 15, 2017, pp. 1-14, USPTO.
Final Office Action, U.S. Appl. No. 15/087,620, Jun. 14, 2018, 15 pages, USPTO.
Final Office Action, U.S. Appl. No. 15/087,620, Feb. 7, 2020, pp. 1-19, USPTO.
First Office Action, CN Application No. 201580067142.2, Apr. 7, 2020, pp. 1-9 including English Translation, SIPO.
International Preliminary Report on Patentability, PCT Application No. PCT/US15/064532, Jun. 13, 2017, pp. 1-9, WIPO.
International Preliminary Report on Patentability, PCT Application No. PCT/US15/064533, Jun. 13, 2017, pp. 1-9, KIPO.
International Preliminary Report on Patentability, PCT Application No. PCT/US2015/064531, Jun. 13, 2017, 10 pages, KIPO.
International Search Report and Written Opinion, PCT Application No. PCT/US15/064532, Mar. 31, 2016, pp. 1-11, KIPO.
International Search Report and Written Opinion, PCT Application No. PCT/US15/064533, Mar. 31, 2016, pp. 1-11, KIPO.
International Search Report and Written Opinion, PCT Application No. PCT/US2015/064531, Mar. 31, 2016, pp. 1-12, KIPO.
Non-Final Office Action, U.S. Appl. No. 14/677,943, Apr. 26, 2017, pp. 1-14, USPTO.
Non-Final Office Action, U.S. Appl. No. 14/677,943, Nov. 20, 2019, pp. 1-13, USPTO.
Non-Final Office Action, U.S. Appl. No. 14/677,943, Feb. 23, 2021, pp. 1-8, USPTO.
Non-Final Office Action, U.S. Appl. No. 14/677,944, Jun. 13, 2017, pp. 1-16, USPTO.
Non-Final Office Action, U.S. Appl. No. 14/677,944, Oct. 19, 2018, pp. 1-15, USPTO.
Non-Final Office Action, U.S. Appl. No. 14/677,945, May 1, 2017, pp. 1-14, USPTO.
Non-Final Office Action, U.S. Appl. No. 14/677,945, Oct. 5, 2018, pp. 1-13, USPTO.
Non-Final Office Action, U.S. Appl. No. 14/677,945, Feb. 23, 2021, 8 pages, USPTO.
Non-Final Office Action, U.S. Appl. No. 15/087,620, Nov. 3, 2017, 18 pages, USPTO.
Non-Final Office Action, U.S. Appl. No. 15/087,620, Jun. 27, 2019, pp. 1-23, USPTO.
Non-Final Office Action, U.S. Appl. No. 15/087,620, Feb. 25, 2021, 9 pages, USPTO.
Notice of Allowance, U.S. Appl. No. 14/677,943, May 26, 2021, 17 pages, USPTO.
Notice of Allowance, U.S. Appl. No. 14/677,944, Mar. 11, 2020, pp. 1-11, USPTO.
Notice of Allowance, U.S. Appl. No. 14/677,945, Apr. 15, 2021, 14 pages, USPTO.
Second Office Action, CN Application No. 201580067142.2, Nov. 5, 2020, pp. 1-17 including English Translation, SIPO.
V4VC Videos-For-Virtual-Currency, 2014, pp. 1-2, Jirbo, Inc., Retrieved from the Internet on Mar. 21, 2014 at URL: adcolony. com/monetization.v4vc/.
Restriction Requirement, U.S. Appl. No. 17/382,085, Sep. 22, 2022, 7 pages, USPTO.
Non-Final Office Action, U.S. Appl. No. 17/382,085, Sep. 22, 2022, 64 pages, USPTO.
Final Office Action, U.S. Appl. No. 17/382,085, Jun. 16, 2023, 22 pages, USPTO.
Advisory Action, U.S. Appl. No. 17/382,085, Aug. 23, 2023, 3 pages, USPTO.

(56)           References Cited

OTHER PUBLICATIONS

Notice of Allowance, U.S. Appl. No. 17/382,085, Oct. 17, 2023, 15 pages, USPTO.

Corrected Notice of Allowance, U.S. Appl. No. 17/382,085, Feb. 7, 2024, 6 pages, USPTO.

Non-Final Office Action, U.S. Appl. No. 14/677,943, 12 pages, USPTO.

Restriction Requirement, U.S. Appl. No. 17/526,459, Feb. 22, 2023, 6 pages, USPTO.

Non-Final Office Action, U.S. Appl. No. 17/526,459, Jul. 18, 2023, 28 pages, USPTO.

Final Office Action, U.S. Appl. No. 17/526,459, Nov. 30, 2023, 27 pages, USPTO.

Non-Final Office Action, U.S. Appl. No. 17/526,459, Mar. 22, 2024, 32 pages, USPTO.

Final Office Action, U.S. Appl. No. 17/526,459, Oct. 24, 2024, 25 pages, USPTO.

Non-Final Office Action, U.S. Appl. No. 17/526,459, Feb. 27, 2025, 40 pages, USPTO.

Non-Final Office Action, U.S. Appl. No. 18/528,093, Mar. 17, 2025, 37 pages, USPTO.

Non-Final Office Action, U.S. Appl. No. 18/528,093, Mar. 17, 2025, 15 pages, USPTO.

Final Office Action, U.S. Appl. No. 18/528,093, Sep. 5, 2025, 15 pages, USPTO.

* cited by examiner

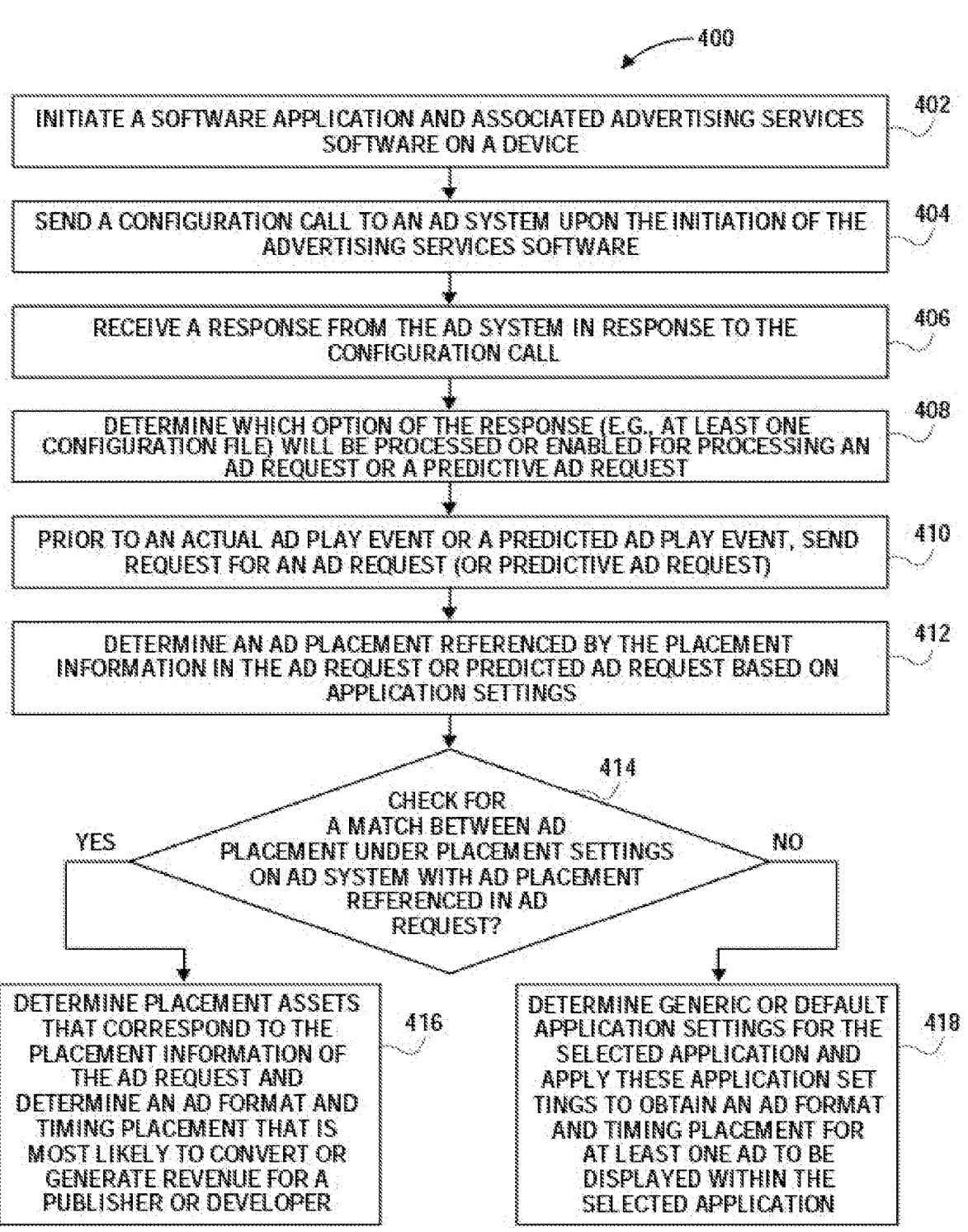

400

| 402 | INITIATE A SOFTWARE APPLICATION AND ASSOCIATED ADVERTISING SERVICES SOFTWARE ON A DEVICE |

| 404 | SEND A CONFIGURATION CALL TO AN AD SYSTEM UPON THE INITIATION OF THE ADVERTISING SERVICES SOFTWARE |

| 406 | RECEIVE A RESPONSE FROM THE AD SYSTEM IN RESPONSE TO THE CONFIGURATION CALL |

| 408 | DETERMINE WHICH OPTION OF THE RESPONSE (E.G., AT LEAST ONE CONFIGURATION FILE) WILL BE PROCESSED OR ENABLED FOR PROCESSING AN AD REQUEST OR A PREDICTIVE AD REQUEST |

| 410 | PRIOR TO AN ACTUAL AD PLAY EVENT OR A PREDICTED AD PLAY EVENT, SEND REQUEST FOR AN AD REQUEST (OR PREDICTIVE AD REQUEST) |

| 412 | DETERMINE AN AD PLACEMENT REFERENCED BY THE PLACEMENT INFORMATION IN THE AD REQUEST OR PREDICTED AD REQUEST BASED ON APPLICATION SETTINGS |

414

CHECK FOR A MATCH BETWEEN AD PLACEMENT UNDER PLACEMENT SETTINGS ON AD SYSTEM WITH AD PLACEMENT REFERENCED IN AD REQUEST?

YES

NO

416 DETERMINE PLACEMENT ASSETS THAT CORRESPOND TO THE PLACEMENT INFORMATION OF THE AD REQUEST AND DETERMINE AN AD FORMAT AND TIMING PLACEMENT THAT IS MOST LIKELY TO CONVERT OR GENERATE REVENUE FOR A PUBLISHER OR DEVELOPER

418 DETERMINE GENERIC OR DEFAULT APPLICATION SETTINGS FOR THE SELECTED APPLICATION AND APPLY THESE APPLICATION SETTINGS TO OBTAIN AN AD FORMAT AND TIMING PLACEMENT FOR AT LEAST ONE AD TO BE DISPLAYED WITHIN THE SELECTED APPLICATION

FIG. 4

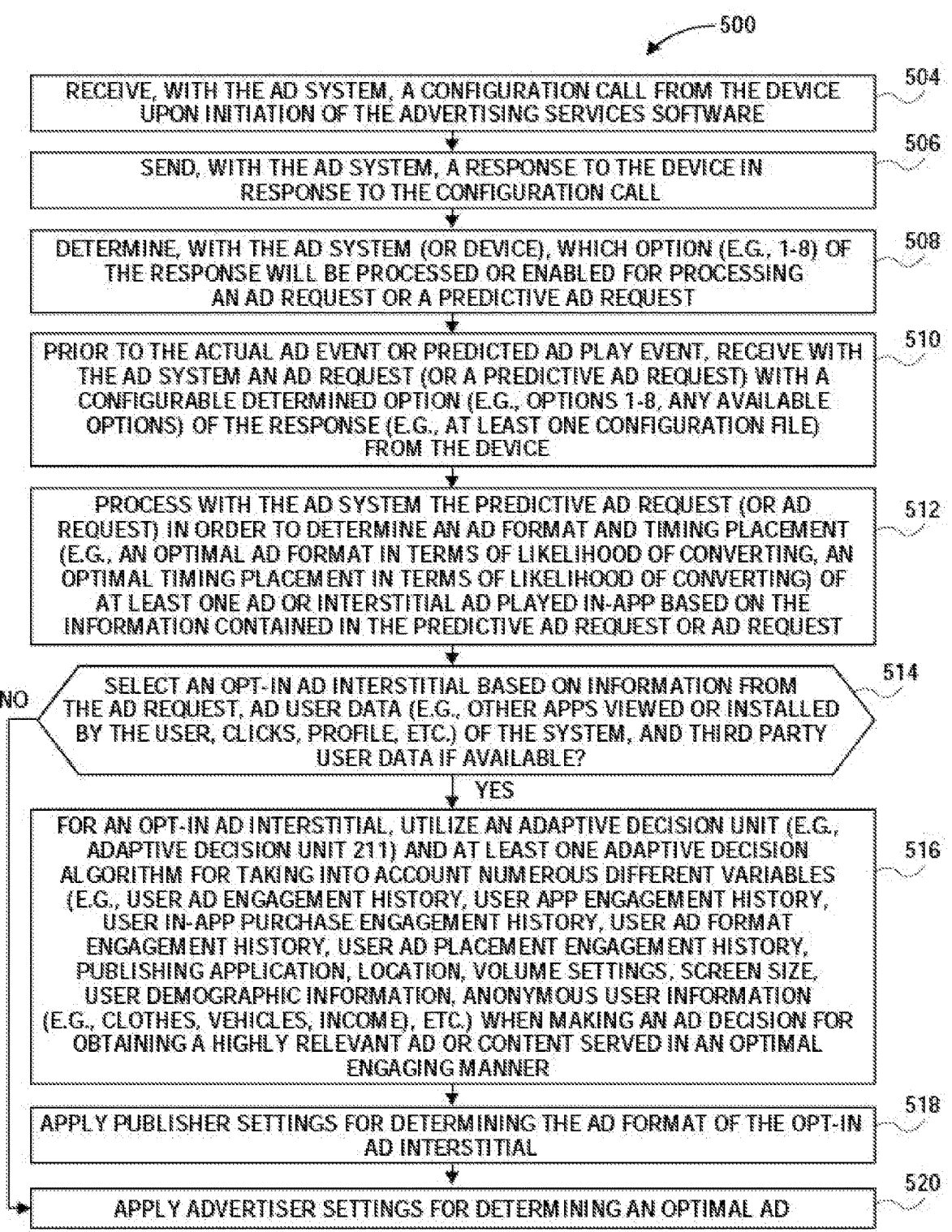

500

RECEIVE, WITH THE AD SYSTEM, A CONFIGURATION CALL FROM THE DEVICE UPON INITIATION OF THE ADVERTISING SERVICES SOFTWARE — 504

SEND, WITH THE AD SYSTEM, A RESPONSE TO THE DEVICE IN RESPONSE TO THE CONFIGURATION CALL — 506

DETERMINE, WITH THE AD SYSTEM (OR DEVICE), WHICH OPTION (E.G., 1-8) OF THE RESPONSE WILL BE PROCESSED OR ENABLED FOR PROCESSING AN AD REQUEST OR A PREDICTIVE AD REQUEST — 508

PRIOR TO THE ACTUAL AD EVENT OR PREDICTED AD PLAY EVENT, RECEIVE WITH THE AD SYSTEM AN AD REQUEST (OR A PREDICTIVE AD REQUEST) WITH A CONFIGURABLE DETERMINED OPTION (E.G., OPTIONS 1-8, ANY AVAILABLE OPTIONS) OF THE RESPONSE (E.G., AT LEAST ONE CONFIGURATION FILE) FROM THE DEVICE — 510

PROCESS WITH THE AD SYSTEM THE PREDICTIVE AD REQUEST (OR AD REQUEST) IN ORDER TO DETERMINE AN AD FORMAT AND TIMING PLACEMENT (E.G., AN OPTIMAL AD FORMAT IN TERMS OF LIKELIHOOD OF CONVERTING, AN OPTIMAL TIMING PLACEMENT IN TERMS OF LIKELIHOOD OF CONVERTING) OF AT LEAST ONE AD OR INTERSTITIAL AD PLAYED IN-APP BASED ON THE INFORMATION CONTAINED IN THE PREDICTIVE AD REQUEST OR AD REQUEST — 512

NO ← SELECT AN OPT-IN AD INTERSTITIAL BASED ON INFORMATION FROM THE AD REQUEST, AD USER DATA (E.G., OTHER APPS VIEWED OR INSTALLED BY THE USER, CLICKS, PROFILE, ETC.) OF THE SYSTEM, AND THIRD PARTY USER DATA IF AVAILABLE? — 514

YES

FOR AN OPT-IN AD INTERSTITIAL, UTILIZE AN ADAPTIVE DECISION UNIT (E.G., ADAPTIVE DECISION UNIT 211) AND AT LEAST ONE ADAPTIVE DECISION ALGORITHM FOR TAKING INTO ACCOUNT NUMEROUS DIFFERENT VARIABLES (E.G., USER AD ENGAGEMENT HISTORY, USER APP ENGAGEMENT HISTORY, USER IN-APP PURCHASE ENGAGEMENT HISTORY, USER AD FORMAT ENGAGEMENT HISTORY, USER AD PLACEMENT ENGAGEMENT HISTORY, PUBLISHING APPLICATION, LOCATION, VOLUME SETTINGS, SCREEN SIZE, USER DEMOGRAPHIC INFORMATION, ANONYMOUS USER INFORMATION (E.G., CLOTHES, VEHICLES, INCOME), ETC.) WHEN MAKING AN AD DECISION FOR OBTAINING A HIGHLY RELEVANT AD OR CONTENT SERVED IN AN OPTIMAL ENGAGING MANNER — 516

APPLY PUBLISHER SETTINGS FOR DETERMINING THE AD FORMAT OF THE OPT-IN AD INTERSTITIAL — 518

APPLY ADVERTISER SETTINGS FOR DETERMINING AN OPTIMAL AD — 520

FIG. 5

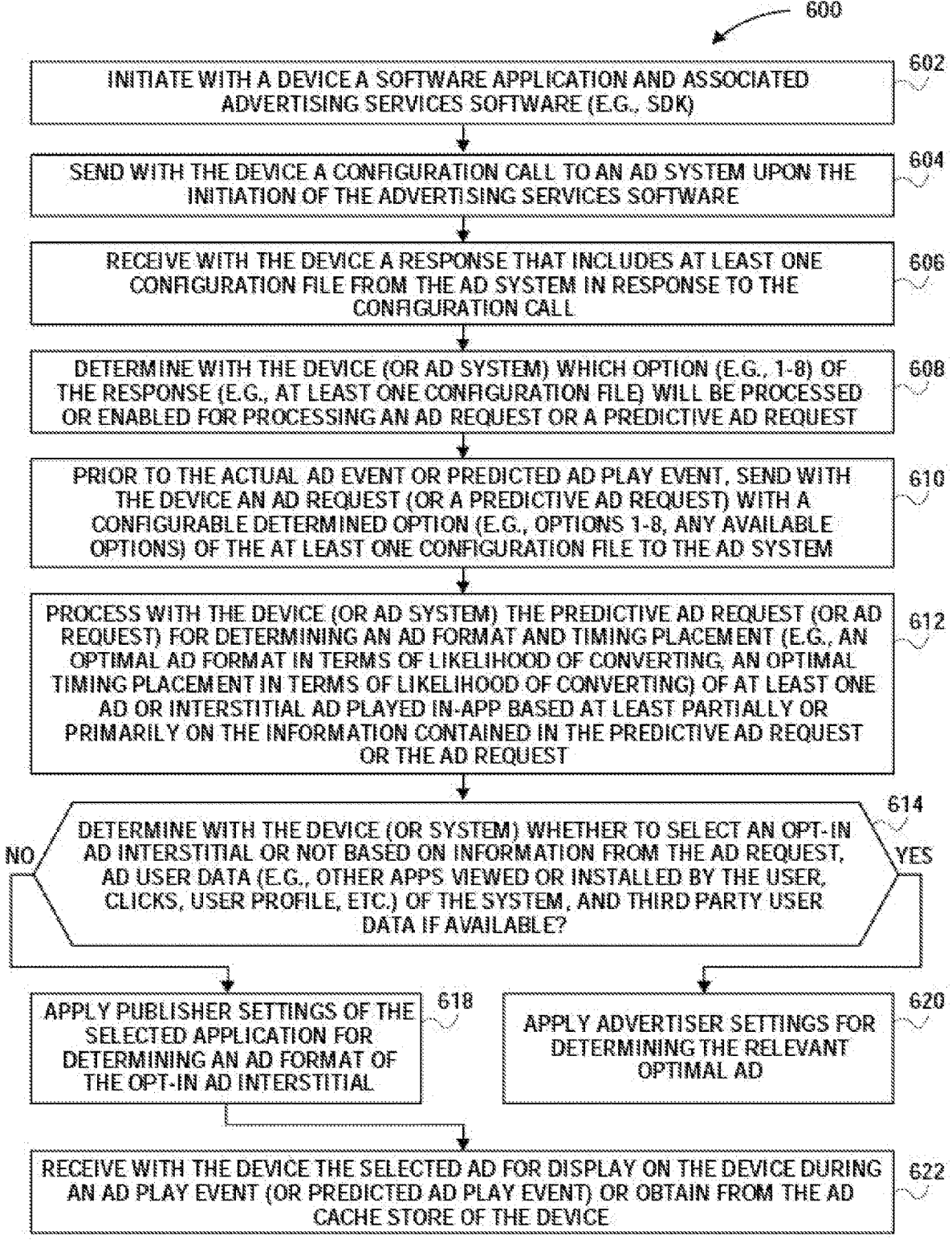

INITIATE WITH A DEVICE A SOFTWARE APPLICATION AND ASSOCIATED ADVERTISING SERVICES SOFTWARE (E.G., SDK) — 602

SEND WITH THE DEVICE A CONFIGURATION CALL TO AN AD SYSTEM UPON THE INITIATION OF THE ADVERTISING SERVICES SOFTWARE — 604

RECEIVE WITH THE DEVICE A RESPONSE THAT INCLUDES AT LEAST ONE CONFIGURATION FILE FROM THE AD SYSTEM IN RESPONSE TO THE CONFIGURATION CALL — 606

DETERMINE WITH THE DEVICE (OR AD SYSTEM) WHICH OPTION (E.G., 1-8) OF THE RESPONSE (E.G., AT LEAST ONE CONFIGURATION FILE) WILL BE PROCESSED OR ENABLED FOR PROCESSING AN AD REQUEST OR A PREDICTIVE AD REQUEST — 608

PRIOR TO THE ACTUAL AD EVENT OR PREDICTED AD PLAY EVENT, SEND WITH THE DEVICE AN AD REQUEST (OR A PREDICTIVE AD REQUEST) WITH A CONFIGURABLE DETERMINED OPTION (E.G., OPTIONS 1-8, ANY AVAILABLE OPTIONS) OF THE AT LEAST ONE CONFIGURATION FILE TO THE AD SYSTEM — 610

PROCESS WITH THE DEVICE (OR AD SYSTEM) THE PREDICTIVE AD REQUEST (OR AD REQUEST) FOR DETERMINING AN AD FORMAT AND TIMING PLACEMENT (E.G., AN OPTIMAL AD FORMAT IN TERMS OF LIKELIHOOD OF CONVERTING, AN OPTIMAL TIMING PLACEMENT IN TERMS OF LIKELIHOOD OF CONVERTING) OF AT LEAST ONE AD OR INTERSTITIAL AD PLAYED IN-APP BASED AT LEAST PARTIALLY OR PRIMARILY ON THE INFORMATION CONTAINED IN THE PREDICTIVE AD REQUEST OR THE AD REQUEST — 612

DETERMINE WITH THE DEVICE (OR SYSTEM) WHETHER TO SELECT AN OPT-IN AD INTERSTITIAL OR NOT BASED ON INFORMATION FROM THE AD REQUEST, AD USER DATA (E.G., OTHER APPS VIEWED OR INSTALLED BY THE USER, CLICKS, USER PROFILE, ETC.) OF THE SYSTEM, AND THIRD PARTY USER DATA IF AVAILABLE? — 614

NO / YES

APPLY PUBLISHER SETTINGS OF THE SELECTED APPLICATION FOR DETERMINING AN AD FORMAT OF THE OPT-IN AD INTERSTITIAL — 618

APPLY ADVERTISER SETTINGS FOR DETERMINING THE RELEVANT OPTIMAL AD — 620

RECEIVE WITH THE DEVICE THE SELECTED AD FOR DISPLAY ON THE DEVICE DURING AN AD PLAY EVENT (OR PREDICTED AD PLAY EVENT) OR OBTAIN FROM THE AD CACHE STORE OF THE DEVICE — 622

FIG. 6

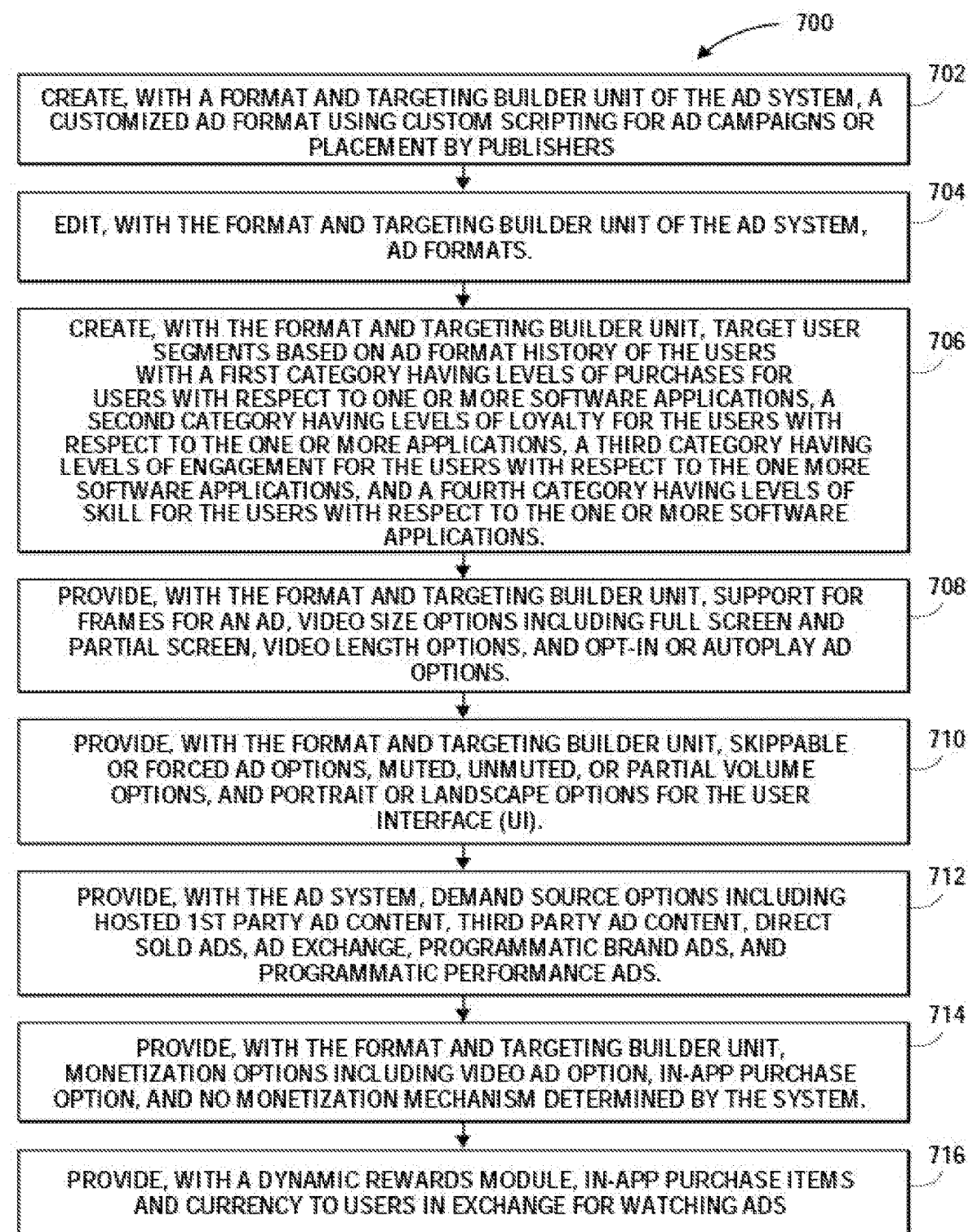

700

CREATE, WITH A FORMAT AND TARGETING BUILDER UNIT OF THE AD SYSTEM, A CUSTOMIZED AD FORMAT USING CUSTOM SCRIPTING FOR AD CAMPAIGNS OR PLACEMENT BY PUBLISHERS

702

EDIT, WITH THE FORMAT AND TARGETING BUILDER UNIT OF THE AD SYSTEM, AD FORMATS.

704

CREATE, WITH THE FORMAT AND TARGETING BUILDER UNIT, TARGET USER SEGMENTS BASED ON AD FORMAT HISTORY OF THE USERS WITH A FIRST CATEGORY HAVING LEVELS OF PURCHASES FOR USERS WITH RESPECT TO ONE OR MORE SOFTWARE APPLICATIONS, A SECOND CATEGORY HAVING LEVELS OF LOYALTY FOR THE USERS WITH RESPECT TO THE ONE OR MORE APPLICATIONS, A THIRD CATEGORY HAVING LEVELS OF ENGAGEMENT FOR THE USERS WITH RESPECT TO THE ONE MORE SOFTWARE APPLICATIONS, AND A FOURTH CATEGORY HAVING LEVELS OF SKILL FOR THE USERS WITH RESPECT TO THE ONE OR MORE SOFTWARE APPLICATIONS.

706

PROVIDE, WITH THE FORMAT AND TARGETING BUILDER UNIT, SUPPORT FOR FRAMES FOR AN AD, VIDEO SIZE OPTIONS INCLUDING FULL SCREEN AND PARTIAL SCREEN, VIDEO LENGTH OPTIONS, AND OPT-IN OR AUTOPLAY AD OPTIONS.

708

PROVIDE, WITH THE FORMAT AND TARGETING BUILDER UNIT, SKIPPABLE OR FORCED AD OPTIONS, MUTED, UNMUTED, OR PARTIAL VOLUME OPTIONS, AND PORTRAIT OR LANDSCAPE OPTIONS FOR THE USER INTERFACE (UI).

710

PROVIDE, WITH THE AD SYSTEM, DEMAND SOURCE OPTIONS INCLUDING HOSTED 1ST PARTY AD CONTENT, THIRD PARTY AD CONTENT, DIRECT SOLD ADS, AD EXCHANGE, PROGRAMMATIC BRAND ADS, AND PROGRAMMATIC PERFORMANCE ADS.

712

PROVIDE, WITH THE FORMAT AND TARGETING BUILDER UNIT, MONETIZATION OPTIONS INCLUDING VIDEO AD OPTION, IN-APP PURCHASE OPTION, AND NO MONETIZATION MECHANISM DETERMINED BY THE SYSTEM.

714

PROVIDE, WITH A DYNAMIC REWARDS MODULE, IN-APP PURCHASE ITEMS AND CURRENCY TO USERS IN EXCHANGE FOR WATCHING ADS

SYSTEMS AND METHODS FOR PROVIDING ADVERTISING SERVICES TO DEVICES WITH A CUSTOMIZED ADAPTIVE USER EXPERIENCE BASED ON ADAPTIVE ALGORITHMS

RELATED APPLICATIONS

This application is a divisional application of U.S. application Ser. No. 17/382,085, filed on Jul. 21, 2021, which claims the benefit of U.S. Provisional Application No. 62/089,195 filed on Dec. 8, 2014, and U.S. Non-Provisional application Ser. No. 14/677,945 filed on Apr. 2, 2015, the entire contents of which are hereby incorporated by reference.

FIELD OF THE INVENTION

Embodiments of the invention are generally related to systems and methods for providing advertising services to devices with a customized adaptive user experience based on adaptive algorithms.

BACKGROUND

Mobile advertising is a form of advertising via mobile (wireless) phones or other mobile devices. Advertisements (ads) can be presented to the intended user in the form of banner ads, text boxes, and video ads. However, these ads may be difficult to distribute to a targeted user in a timely manner and the user may not be responsive and interested in the ads.

SUMMARY

Methods and systems are described for providing advertising services to devices with a customized adaptive user experience based on adaptive algorithms. In one embodiment, a system includes a storage medium to store one or more software programs and an adaptive decision unit coupled to the storage medium. The adaptive decision unit including or being coupled to processing logic that is configured to execute instructions of at least one adaptive decision algorithm to obtain data for different variables including at least two of an advertisement (ad) engagement history for a user, application (app) engagement history for the user, and in-app purchase engagement history for the user when making an ad selection decision. The processing logic is configured to execute instructions of at least one adaptive decision algorithm to determine an ad selection decision for at least one relevant ad or ad content served in an engaging manner to a device of the user based on the data of the different variables for the ad selection decision. The different variables further include ad format engagement history for the user, ad placement engagement history for the user, publishing application, location, volume settings, and screen size of the device.

Other embodiments are also described. Other features of embodiments of the present invention will be apparent from the accompanying drawings and from the detailed description which follows.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 4 illustrates a flow diagram of operations for a method of providing advertising services including ads or ad campaigns to devices with a customized adaptive user experience in accordance with one embodiment.

FIG. 5 illustrates a flow diagram of operations for a method of providing advertising services including ads or ad campaigns with a customized adaptive user experience including an adaptive decision unit in accordance with one embodiment.

FIG. 6 illustrates a flow diagram of operations for a method of providing advertising services including ads or ad campaigns with a customized adaptive user experience in accordance with one embodiment.

FIG. 7 illustrates a flow diagram of operations for a method of providing advertising services including ads or ad campaigns with a customized adaptive user experience including an ad format and targeting builder in accordance with one embodiment.

DETAILED DESCRIPTION

Figure 1:
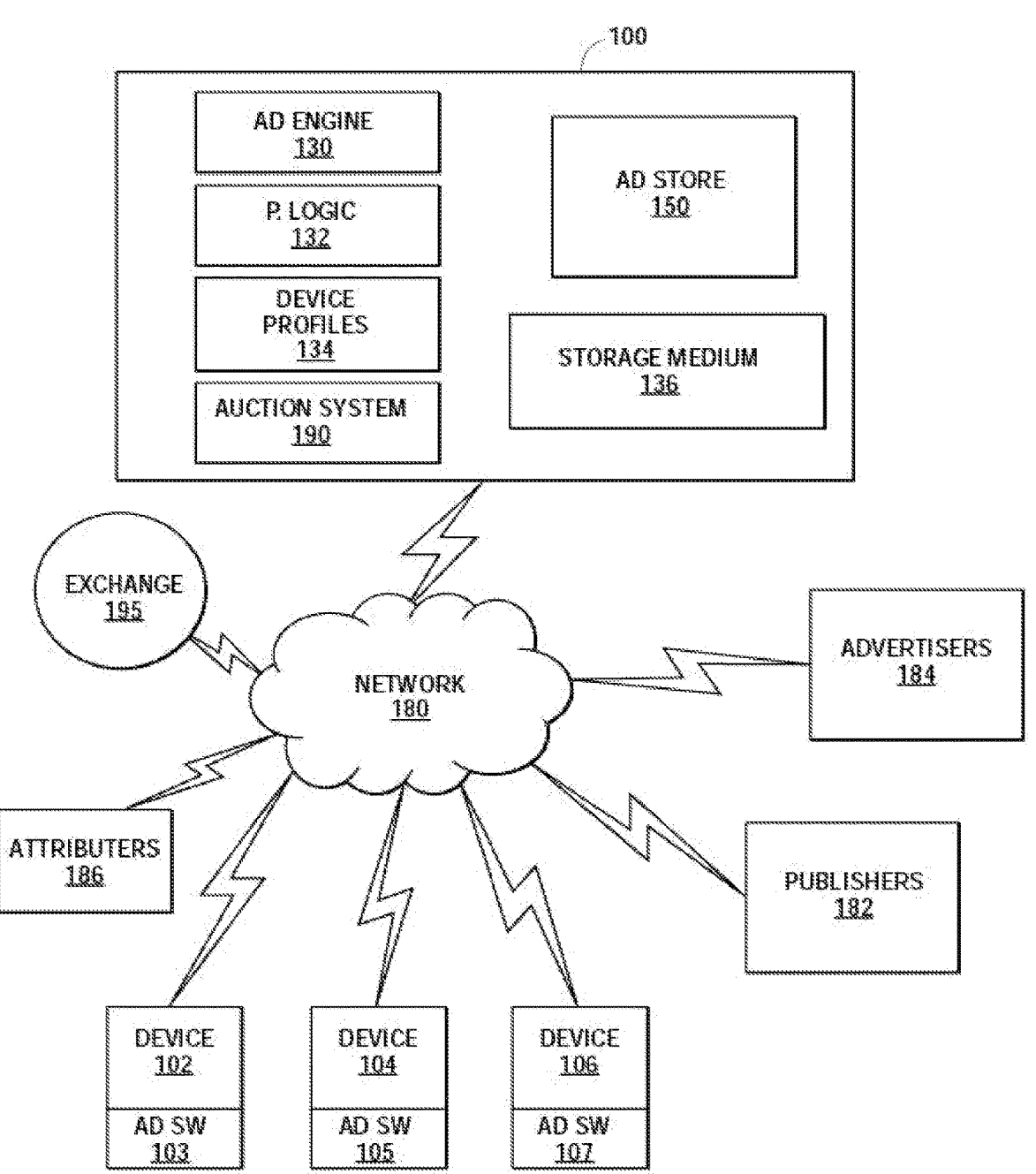
FIG. 1 shows an embodiment of a block diagram of a system 100 for providing advertising services to devices with a customized adaptive user experience in accordance with one embodiment.

Methods and systems are described for providing advertising services to devices with a customized adaptive user experience. In one embodiment, a system includes a storage medium to store one or more software programs and an adaptive decision unit coupled to the storage medium. The adaptive decision unit including or being coupled to processing logic that is configured to execute instructions of at least one adaptive decision algorithm to obtain data for different variables including at least two of an advertisement (ad) engagement history for a user, application (app) engagement history for the user, and in-app purchase engagement history for the user when making an ad selection decision. The processing logic is configured to execute instructions of at least one adaptive decision algorithm to determine an ad selection decision for at least one relevant ad or ad content served in an engaging manner to a device of the user based on the data of the plurality of different variables for the ad selection decision. The variables further include ad format engagement history for the user, ad placement engagement history for the user, publishing application, location, volume settings, and screen size of the device.

An auction system provides a mechanism for third party participants to bid on providing advertising services including in-application (in-app) advertising services to the device in response to an actual or predictive ad exchange request. The auction system captures demand for providing advertising services in real time or near real time prior to the actual or the predicted ad play event on the device.

In mobile video advertising, high performing campaigns are needed for advertisers, publishers, and users of the publishers. Advertisers include organizations that pay for advertising services including ads on a publisher network of applications and games. Publishers provide content for users. Publishers can include developers of software applications, mobile applications, news content, gaming applications, sports news, etc. The publishers are interested in generating revenue through selling ad space to be on displayed in video ads to their users.

Performance can be defined in terms of click-through rates (CTR), conversion rates, and video completion rates. The process in which a user selects an ad is referred to as a click-through, which is intended to encompass any user selection. The ratio of a number of click-throughs to a number of times an ad is displayed is referred to as the CTR of the ad. A conversion occurs when a user performs a transaction related to a previously viewed ad. For example, a conversion may occur when a user views a video ad and installs an application being promoted in the video ad. A conversion may occur when a user views a video ad and installs an application being promoted in the video ad within a certain time period. A conversion may occur when a user is shown an ad and decides to make a purchase on the advertiser's web site within a certain time period. The ratio of the number of conversions to the number of times an ad is displayed is referred to as the conversion rate. A video completion rate is a ratio of a number of video ads that are displayed to completion to a number of video ads initiated on a device. Advertisers may also pay for their ads through an advertising system in which the advertiser bid on ad placement on a cost-per-click (CPC), cost-per-mille (CPM), cost-per-completed-view (CPCV), cost-per-action (CPA), and/or cost-per-install (CPI) basis. A mille represents a thousand impressions.

In this section several embodiments of this invention are explained with reference to the appended drawings. Whenever the shapes, relative positions and other aspects of the parts described in the embodiments are not clearly defined, the scope of the invention is not limited only to the parts shown, which are meant merely for the purpose of illustration.

FIG. 1 shows an embodiment of a block diagram of an ad system 100 for providing advertising services to devices with a customized adaptive user experience in accordance with one embodiment. The ad system 100 includes an advertising engine 130, processing logic 132, device profiles 134, storage medium 136, an ad store 150, and an auction system 190. The auction system 190 may be integrated with the ad system or separate from the ad system. The system 100 provides advertising services for advertisers 184 to devices 102, 104, and 106 (e.g., source device, client device, mobile phone, tablet device, lap top, computer, connected or hybrid television (TV), IPTV, Internet TV, Web TV, smart TV, satellite device, satellite TV, automobile, airplane, etc.). A device profile for a device is based on one or more parameters including location (e.g., GPS coordinates, IP address, cellular triangulation, etc.) of the device, a social profile for a user of the device, and categories or types of applications installed on the device. Each device includes a respective advertising services software 103, 105, 107 (e.g., a software development kit (SDK)) that includes a set of software development tools for advertising services including in-app advertising services. The publishers 182 publish content along with selling ad space to advertisers. Attributers 186 may install software (e.g., software development kits of publishers) on client devices and track user interactions with publisher applications and advertisements. The attributers can then share this user data with the system 100 and the appropriate publishers and advertisers. The system 100, devices 102, 104, 106, advertisers 184, publishers 182, attributers 186, and an ad exchange 195 with third party exchange participants communicate via a network 180 (e.g., Internet, wide area network, WiMax, satellite, etc.). The third party exchange participants can bid in real time or approximately in real time (e.g., 1 hour prior to an ad being played on a device, 15 minutes prior to an ad being played on a device, 1 minute prior to an ad being played on a device, 15 seconds prior to an ad being played on a device, less than 1 second prior to an ad being played on a device) using the auction system 190 to provide advertising services (e.g., an in-app video ad that includes a preview (e.g., video trailer) of an application, in-app ad campaigns for brand and performance advertisers) for the devices. The processing logic 132 may include a filtering functionality for filtering potential available ad campaigns, an optimizer functionality for determining an optimal ad campaign, and a selector (picker) functionality for selecting an optimal campaign. The filtering functionality may filter ad campaigns based on availability, device characteristics (e.g., device profiles 134, OS type, network connection for user's device, whether user's device is mobile device or tablet device, volume, screen size and orientation, language setting, etc.), and user characteristics (e.g., age, gender, ethnicity, location, etc.), etc.

In one embodiment, the system 100 includes a storage medium 136 to store one or more software programs. Processing logic (e.g., 132) is configured to execute instructions of at least one software program to receive an advertising request from a device upon the device having an ad play event for an initiated software application and associated advertising services software (e.g., software development kit (SDK)) on the device. The processing logic is further configured to send a configuration file to the device in response to the configuration call. The configuration file includes different options for obtaining at least one advertisement (ad) to play on the device during an ad play event. The options include playing at least one ad cached on the device, obtaining at least one ad from an ad store of the ad system 100, and obtaining at least one ad from an advertising exchange that includes 3 party participants.

Figure 2:
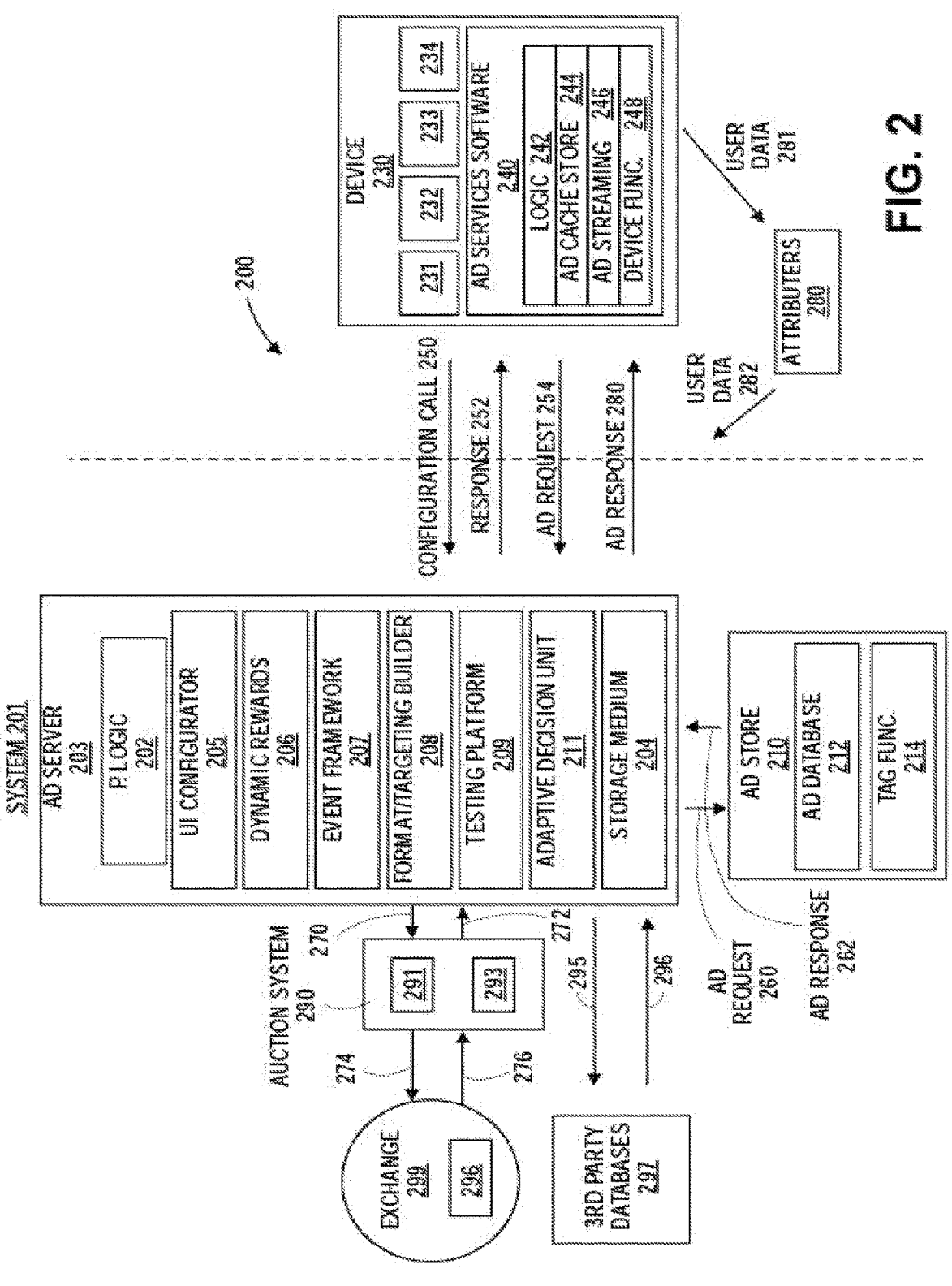
FIG. 2 illustrates a flow diagram of operations for providing advertising services including ads or ad campaigns to devices with a customized adaptive user experience in accordance with one embodiment.

FIG. 2 illustrates a flow diagram of operations for providing advertising services including ads or ad campaigns with a customized adaptive user experience in accordance with one embodiment. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a system performs the operations of method 200.

A device 230 (e.g., source device, client device, mobile phone, tablet device, lap top, computer, connected or hybrid television (TV), IPTV, Internet TV, Web TV, smart TV, etc) initiates a software application (e.g., at least one of software applications 231-234). For example, a user may select one of the software applications installed on the device. The advertising services software 240 is also initiated upon the initiation of one of the software applications. The advertising services software 240 may be associated with or embedded with the software applications. The advertising services software 240 may include or be associated with logic 242 (e.g., communication logic for communications such as an ad request), an ad cache store 244 for storing one or more ads or ad campaigns, ad streaming functionality 246 for receiving, optionally storing, and playing streamed ads, and device functionality 248 for determining device and connection capabilities (e.g., type of connection (e.g., 4G LTE, 3G, WiFi, WiMax, etc.), bandwidth of connection, location of device, type of device, display characteristics (e.g., pixel density, color depth), etc.). The initiated software application or advertising services software may have an ad play event for displaying or playing an ad on the display of the device. At operation 250, processing logic 202 of an ad server 204 of system 201 receives a configuration call from the device 230 upon the initiation of the software application and associated advertising services software 240. At operation 252, the processing logic 202 sends a response that includes at least one configuration file to the device 230 in response to the configuration call. The at least one configuration file includes different options for obtaining an ad to play for the ad play event. In one embodiment, a first option includes playing at least one ad that is cached on the device 230 during the ad play event. A second option includes planning to play at least one ad that is cached on the device 230 but asking for at least one better ad from the system 201. If the system 201 obtains and delivers at least one better ad in a timely manner (e.g., in time for a predicted ad play event, within a time period set by the at least one configuration file) then the at least one better ad will play during the predicted ad play event. The at least one better ad is expected or predicted to have a higher conversion rate or higher likelihood of obtaining a user interaction or engagement than the at least one cached ad. Otherwise, the cached ad is played. A third option includes planning to play at least one ad that is cached on the device 230 but asking for at least one better ad from the exchange 299. If the exchange 299 including third party databases 296 provides at least one better ad in a timely manner then the better ad will play during the ad play event. Otherwise, the cached ad is played. A fourth option includes planning to play at least one ad that is cached on the device 230 but asking for at least one better ad from the system 201 or the exchange 299. If the system 201 or the exchange 299 provide at least one better ad in a timely manner then the better ad will play during the ad play event. Otherwise, the cached ad is played.

A fifth option includes streaming at least one ad to be played during the predicted ad play event to the device 230. A sixth option includes planning to play at least one ad that is streamed to the device 230 but asking for at least one better ad from the system 201. If the system 201 provides the at least one better ad in a timely manner (e.g., in time for the ad play event, within a time period set by the configuration file) then the better ad will play during the ad play event. Otherwise, the planned streamed ad is played. A seventh option includes planning to play at least one ad that is streamed to the device 230 but asking for at least one better ad from the exchange 299. If the exchange 299 provides a better ad in a timely manner then the better ad will play during the ad play event. Otherwise, the planned streamed ad is played. An eighth option includes planning to play at least one ad that is streamed to the device 230 but asking for at least one better ad from the system 201 or the exchange 299. If the system 201 or the exchange 299 provide a better ad in a timely manner then the better ad will play during the predicted ad play event. Otherwise, the planned streamed ad is played. In others embodiments, the configuration file includes a subset of the options 1-8, additional options for obtaining at least one ad or ad campaign, or different options (e.g., options that include potential caching and streaming operations).

The configuration file can be altered by the system 201 or the device 230 without affected the advertising services software 240. In particular, the configuration file can be altered without affecting a version of the advertising services software 240 such that a user does not need to update a version of the advertising services software even if the configuration file changes. The system 201 is designed to deliver the most relevant and highest converting ads to devices using the configuration file without causing the user to perform any update to the version of the advertising services software.

At operation 254, prior to a predicted ad play event or an actual ad play event, the processing logic of the ad server optionally receives an ad request with a configurable option (e.g., options 1-8) of the at least one configuration file based on an anticipated ad play event occurring in the near future (e.g., 1 hr, 15 minutes, 60 seconds, 10 seconds, etc.). The ad request may be a predictive ad request if it occurs prior to a predicted ad play event. Alternatively, the ad server generates an ad request based on receiving the configuration call, which indicates that the user has initiated a software application and an anticipated ad play event will likely occurring in the near future even though no ad request is received from the device.

The ad request includes different types of information including publisher settings (e.g., a publisher of the selected software application), an application id to identify the selected software application, placement information for timing placement of an ad in-app, user characteristics, device characteristics (e.g., device id, OS type, network connection for user's device, whether user's device is mobile device or tablet device, volume, screen size and orientation, language setting, etc.), geographical data, location data, motion data (e.g., motion data from an accelerometer or gyroscope), language, time, application settings, demographic data for the user of the device, session data (e.g., how long a user has been using the selected application), and cache information. The ad server processes the ad request to determine an ad format and timing placement (e.g., an optimal ad format in terms of likelihood of converting, an optimal timing placement in terms of likelihood of converting) of at least one ad or interstitial ad played in-app based on the information contained in the predictive ad request. The ad server determines an ad format and timing placement that is most likely to convert, generate revenue for a publisher or a developer, or cause user interaction or engagement with the ad.

A user interface (UI) configurator 205 provides a custom scripting framework for publishers or developers to create and edit fully customizable ad formats. The UI configurator can create web pages using hypertext markup language (html) and cascade style sheets (CSS). The custom scripting framework provides improved computer functionality of the ad server 203 because publishers have unlimited flexibility over the look and feel of their ad integration in order to increase user interaction and engagement with the customized ad. For example, a publisher can add a frame around a video ad if desired or the publisher can add an opt in interstitial after a certain level of a software application. An opt in interstitial provides the user the option of viewing an advertisement. A reward interstitial provides rewards or currency for a software application (e.g., gaming application, news application, social media application, etc.) in exchange for the user deciding to view the advertisement. There is no need to update an application on a client device because the format changes are handled with the ad server 203. The UI configurator may include a software development kit (SDK) or software tools. The SDK or software tools may be loaded on the device.

The UI configurator 205 communicates with or includes an event framework 207 for tracking events. Publishers and developers typically do not know how or when to track events. The event framework tracks different kinds of events including default events, which may include tutorial completion, in-app purchase, positive achievement, negative achievement, etc. for an initiated software application on the user's device. In this manner, the publishers and developers have a better understanding of user's interests and engagement with the ads displayed to the user based on the improved computer functionality of the event framework of the ad server 203. Publishers and developers earn additional revenue when events are tracked.

The dynamic rewards module 206 allows users to sample in-app purchase items and currency in exchange for watching ads (e.g., video ads). The dynamic rewards unit 206 changes the reward offered to each user in a dynamic manner to maximize both ad and in-app purchase revenue.

The ad format and targeting builder unit 208 may communicate with the UI configurator or be a separate unit. The ad format and targeting builder unit 208 allows a publisher or developer to create a new custom ad format while targeting the ad for one or more user segments, perform testing of different ad formats or timing placements, and launch in app without leaving a UI (e.g., dashboard) provided by the system 201. The ad format and targeting builder unit 208 provides improved computer functionality of the ad server 203 because a custom ad format is combined with targeting features for different user segments. Any changes or edits for any aspect of the ad services are performed on the ad system. The advertising services software can be integrated with a software application of the publisher or developer and updated with any type of customized adaptive user experience without the user needing to update the software application of the publisher or developer.

The ad format and targeting builder provides the following options to developers and publishers (e.g., developers and publishers of mobile applications): custom scripting for fully custom look and feel; support for frames for an ad; video size options (e.g., full screen, partial screen, etc.); video length options (e.g., 15 seconds, 30 seconds, long form, all of these options, etc.); opt-in or autoplay ad options; skippable or forced ad options; muted, unmuted, or partial volume options; portrait or landscape options for the UI of a device, target user segments (e.g., non-payers, payers, highest payers; new users, loyal users, at risk users; high, medium, and low engagement users; advanced, intermediate, and beginner users); demand source options (e.g., hosted 1st party ad content, third party ad content, direct sold ads (e.g., direct sold ads between ad system and advertisers), ad exchange, programmatic brand ads, programmatic performance ads); and monetization options (e.g., video ad, in-app purchase), determined by the system 201, for best monetization mechanism for a specific user based on most likely conversion rate for video ad and in-app purchase. Alternatively, no monetization mechanism may be determined or used by the system 201.

The testing platform 209 allows publishers or developers to perform multiple concurrent tests on different ad formats and placements to determine which test has the best results in terms of revenue, conversions, positive reviews, etc. For example, changing the messaging on an opt-in ad interstitial can lead to increased revenue for a publisher. A publisher may increase pay wall conversion by targeting high engagement users with a pay wall. A TV app may increase positive reviews by prompting users after a positive event versus at app open or initiation.

An adaptive decision unit 211 includes adaptive decision algorithms that take into account numerous different variables (e.g., user ad engagement history, user app engagement history, user in-app purchase engagement history, user ad format engagement history, user ad placement engagement history, publishing application, location, volume settings of a user's device, screen size of the user's device, etc.) when making an ad decision for obtaining a highly relevant ad or content served in an optimal engaging manner. The adaptive decision unit 211 improves computer targeting functionality and user conversion functionality of the ad server 203 based on considering the numerous different variables for making an improved ad selection decision.

In one embodiment, a system 201 includes a storage medium 204 to store one or more software programs and an adaptive decision unit 211 coupled to the storage medium. The adaptive decision unit 211 includes processing logic or is coupled to processing logic 202 that is configured to execute instructions of at least one adaptive decision algorithm to obtain data for different variables including at least two of an advertisement (ad) engagement history for a user, application (app) engagement history for the user, and in-app purchase engagement history for the user when making an ad selection decision. The processing logic is configured to execute instructions of at least one adaptive decision algorithm to determine an ad selection decision for at least one relevant ad or ad content served in an engaging manner to a device of the user based on the data of the different variables for the ad selection decision. The different variables further include ad format engagement history for the user, ad placement engagement history for the user, publishing application, location, volume settings, and screen size of the device.

Attributers 280 may have software (e.g., a SDK of the publisher of the application) installed on the user's device in order to obtain third party user data (e.g., user data 281 from the device 230). This user data may include tracking of a user's interaction and engagement with the software application, a length of time that the application is installed, an amount of purchases from the application, and buying patterns in terms of which products or services are purchased and when these products or services are purchased.

The user data may also include monitoring target goals for how the user engages with the application. The user data (e.g., user data 282) can be shared with system 201, publishers, and advertisers.

The ad server also processes the ad request (or predictive ad request) and accesses at least one of the ad store 210 and the exchange 299 for options 2-8 of the at least one configuration file to obtain at least one ad or ad campaign that is likely or most likely to convert. The ad server may determine which option of options 1-8 will be processed or enabled for processing the ad request (or predictive ad request) based on one or more configurable parameters. Alternatively, the device or user may determine which option of options 1-8 will be processed or enabled based on these parameters. In one embodiment, the configurable parameters include the bandwidth for the connection between the device and the ad server, bandwidth for a connection between the ad system and one or more participants of the exchange, latency for a participant of the exchange, device characteristics, user characteristics, a service level agreement of the publisher (e.g., latency), a cache window, and business rules including location, time of day, availability of new ad campaigns, and availability of higher converting campaigns (e.g., performance data), historical data, and recent data (e.g., latency for an auction with the exchange). For example, if a low bandwidth is detected between the ad server and the device or between the ad system and auction participants, then the ad server may send an ad request to the ad store or the auction system sooner rather than later. In one embodiment, the ad request (or predictive ad request) is sent to the ad store or the auction system immediately or a short time after the low bandwidth is detected. A third party participant within the exchange or outside of the exchange may provide the ad system with timing parameters. For example, a third party participant may indicate to only request an ad if an ad is about to be served to a device (e.g., within 2 seconds, within 15 seconds) or if an ad will likely be served to a device in the next hour or so.

In one example, bandwidth for the connection between the device and the ad server or between the device and the ad system determines availability of at least some of these options (e.g., options 1-8). A low bandwidth connection (e.g., cellular connection, 3G connection) may cause options 2-4, streaming options 5-8, or options 2-8 to be disabled in order to avoid sending or attempting to send an ad payload with at least one video ad or video ad campaign across the low bandwidth connection. In this manner, the ad system improves utilization of available bandwidth for this connection and does not lead to user frustration in having the low bandwidth connection slow operations and performance of the user's device. In another example, a moderate or high bandwidth connection (e.g., WiFi connection, 4G LTE connection, 5 generation mobile networks or $5^{th}$ generation wireless systems (5G) connection) may cause options 1-8 to be enabled in order to allow the option of additional ad inventory with more engaging ads and higher conversion rates for sending an ad payload with at least one video ad or video ad campaign across the moderate or high bandwidth connection. In this manner, the ad system improves utilization of available bandwidth for this moderate or high connection with sufficient bandwidth for performing options 2-8.

For option 1, the device plays at least one ad from cache. For options that access the ad store 210, at operation 260, the processing logic 202 sends an ad call or request (or a predictive ad call or request) to the ad store 210 of the system 201. The ad store includes an ad database 212 having ad campaigns and ads. The ad database 212 may be a first party ad database, i.e., a database of system 201. The ad store may optionally provide access to third party ad databases 297 via tag functionality 214. The tag functionality 214 generates or stores an ad serving tag for accessing one or more third party ad databases 297. The ad campaigns and ads are capable of being streamed to ad streaming 246 of the device or saved in an ad cache store 240 of the device.

At operation 262, the ad server receives an ad response from the ad store 210 in response to the ad call or request (or predictive ad call or request). The ad response includes a payload with one or more potential ads or ads campaigns for being streamed to the device 230 or optionally an ad serving tag for accessing one or more third party ad databases 297. If the ad server receives an ad serving tag, then the ad server sends an ad request (or predictive ad request) to the third party database at operation 295 and receives an ad response (or predictive ad response) at operation 296 from the third party database 297. The ad response from the ad store or the third party databases 297 includes one or more ads or ad campaigns for being sent or streamed to the device 230. The processing logic 202 decides whether to stream at least one ad or ad campaign to the device 230 based on the determined or selected option of the at least one configurable file.

The ad server upon processing an ad request (or a predictive ad request) may access the exchange 299 given certain options (e.g., options 3, 4, 7, and 8) of the at least one configuration file. In this case, the ad server sends an exchange request (or a predictive exchange request 270) to the auction system 290 having an auction engine 291 and database 293 prior to a predicted ad play event or actual ad play event on the device. Alternatively, the auction system is integrated with the ad system 201. The auction engine 291 processes the ad exchange request 270 and generates an auction based on different business rules including at least one of a price (e.g., a floor or lowest price for the ad or ad campaign), inventory allocation, and participants who can participate in the auction. The auction determines which participant can provide a better ad for the device in a timely manner. At operation 274, the auction system 290 sends an ad exchange request (or a predictive ad exchange request to each participant of the auction). The ad exchange request (or predictive ad exchange request) includes configurable parameters including at least one of ad length, bit rate for playing the ad, ad categories, age ratings, a limit for a number of redirects to minimize latency, and the floor price. The configurable parameters are designed to enhance a user experience (e.g., by minimizing latency) and provide safety for the user based on the age rating. One or more participants then respond with an ad exchange response (or a predictive ad exchange response) at operation 276. The auction engine processes the ad exchange responses (or predictive ad exchange responses) (bids) and determines which participant(s) if any will serve a better ad for playing on the device for an actual ad play event (or a predicted ad play event). The responses and ads from the participants can be saved in the database 293. At operation 272, an ad response (or a predictive ad response) is sent from the auction engine to the ad server. The ad server then processes the ad from a winning or selected participant as determined by the auction system. In this case, the ad server unpacks the payload of the ad and converts a format of the ad (if necessary) into a standard format (e.g., xml standard, digital video ad serving template (VAST)) for ads served by the ad server. The ad server can compare a better ad from the winning or selected participant from the exchange or possibly any of the bids from the exchange with a cached ad on the device and a better ad obtained with an ad response from the ad store. At operation 280, the ad server can then select at least one better ad from the ad store, a participant with a winning or selected bid from the exchange, a cached ad on the device, or optionally a third party database 297 that has not participated in the exchange. A better ad is anticipated to be more likely to convert or have a higher likelihood of obtaining a user interaction than the cached ad on the device. The at least one better ad if selected is then cached on the device or streamed to the device and played during the actual ad play event or a predicted ad play event that has been predicted to occur.

In one embodiment, the exchange is a private exchange that includes a limited number of private participants. The private exchange may be accessed in combination with accessing ads from the ad store and optionally with accessing ads from third party databases via ad serving tags. In another embodiment, the exchange is a public exchange that includes a limited number of public participants or an unlimited number of participants that meet the requirements of the configurable parameters. The public exchange may be accessed in combination with accessing ads from the ad store and optionally with accessing ads from third party databases via ad serving tags.

In a conventional ad network, a user initiates a software application on a mobile device and then the mobile device sends an ad request to the ad network. The ad network responds with an ad response. The mobile device then caches the ad contained with the ad response and plays the ad from cache during an ad play event. However, better, fresher, more relevant, customized, and adaptive ads (i.e., higher converting ads) may be available in comparison to the cached ad of the conventional ad network.

Figure 3:
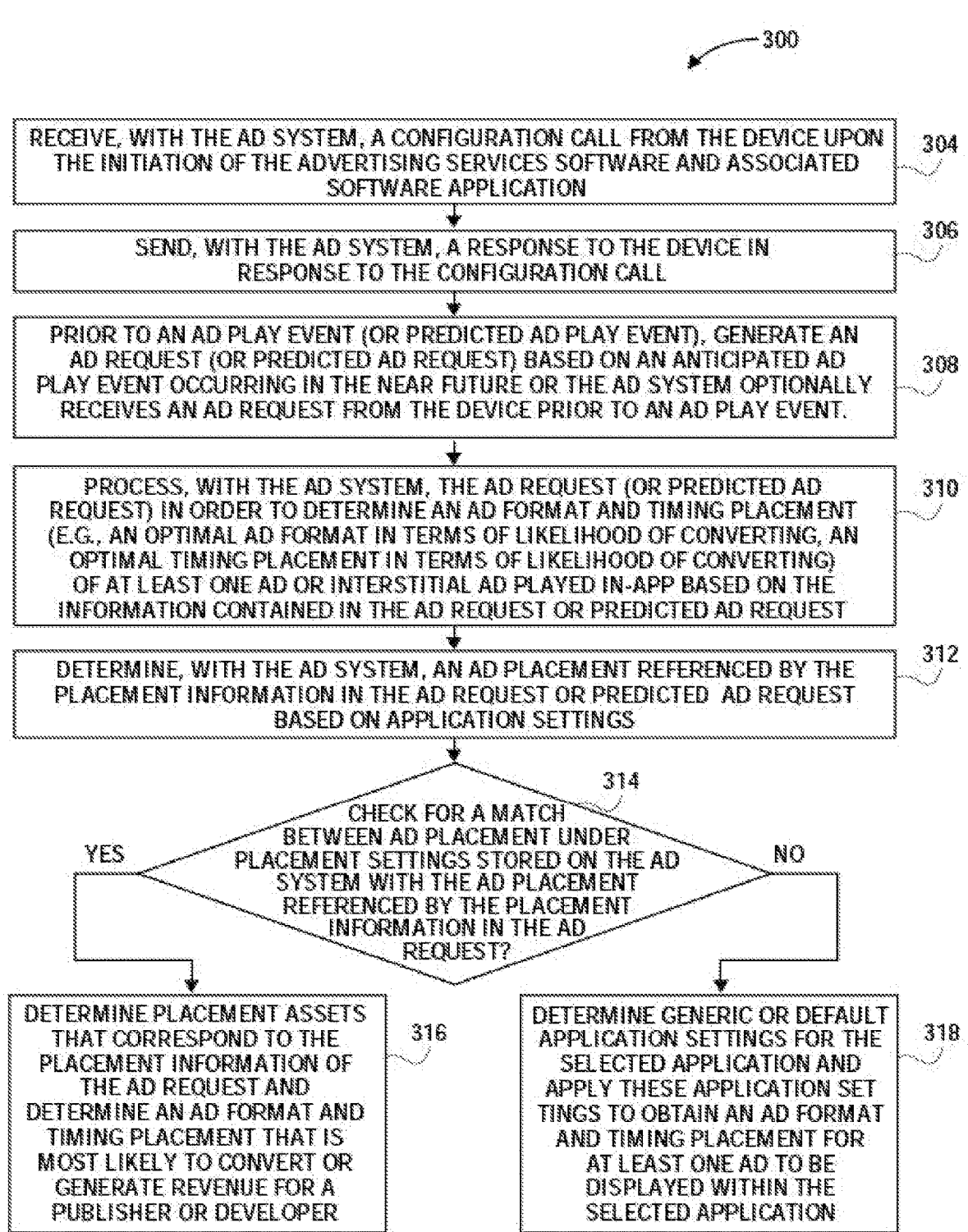
FIG. 3 illustrates flow diagrams of operations for a method of providing advertising services including ads or ad campaigns to devices with a customized adaptive user experience in accordance with one embodiment.

FIG. 3 illustrates a flow diagram of operations for a method of providing advertising services including ads or ad campaigns to devices with a customized adaptive user experience in accordance with one embodiment. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a system performs the operations of method 300.

In one embodiment, a device initiates a software application. For example, a user may select one of the software applications. The advertising services software (e.g., SDK) is also initiated upon the initiation of the software application. The advertising services software may be associated with or embedded with the software application. The advertising services software may include or be associated with logic 242, an ad cache store 244, ad streaming functionality 246, and device functionality 248 of device 230. The initiated software application may have an actual ad play event or a predicted ad play event at a future time for displaying or playing an ad on the display of the device. At operation 304, an ad system (e.g., ad server of the ad system) receives a configuration call from the device upon the initiation of the advertising services software and associated software application. At operation 306, the ad system (e.g., ad server of the ad system) sends a response that includes at least one configuration file to the device in response to the configuration call. The at least one configuration file includes different options (e.g., options 1-8 as described in conjunction with the description of FIG. 2) for obtaining an ad to play for the ad play event that is predicted to occur in the future.

At operation 308, prior to an ad play event (or predicted ad play event), the processing logic of the ad system (e.g., processing logic of the ad server) generates an ad request (or predicted ad request) based on an anticipated ad play event occurring in the near future (e.g., 1 hr, 15 minutes, 60 seconds, 10 seconds, etc.) or the ad server optionally receives an ad request from the device prior to an ad play event. Receiving the at least one configuration call from the device indicates that the user has initiated a software application and an anticipated ad play event will likely occur in the near future even if no predicted ad request is received from the device.

At operation 310, the ad system (e.g., ad server of the ad system) processes the ad request (or predicted ad request) in order to determine an ad format and timing placement (e.g., an optimal ad format in terms of likelihood of converting, an optimal timing placement in terms of likelihood of converting) of at least one ad or interstitial ad played in-app based on the information contained in the ad request or predicted ad request.

At operation 312, the ad server, determines an ad placement referenced by the placement information in the ad request (or predicted ad request) based on application settings. At operation 314, the ad server checks for a match between ad placement under placement settings stored on the system or ad server with the ad placement referenced by the placement information in the ad request (or predicted ad request). At operation 316, if a match is determined, then the ad server determines placement assets (e.g., id matching, ad format, placement timing, ad content) that correspond to the placement information of the ad request (or predicted ad request). The ad server determines an ad format and timing placement that is most likely to convert, cause user interaction or engagement, or generate revenue for a publisher or developer. At operation 318, if a match is not determined, then the system or ad server determines generic or default application settings for the selected application and applies these application settings to obtain an ad format and timing placement for at least one ad to be displayed within the selected application.

FIG. 4 illustrates a flow diagram of operations for a method of providing advertising services including ads or ad campaigns with a customized adaptive user experience in accordance with one embodiment. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a device performs the operations of method 400.

In one embodiment, a device initiates a software application at operation 402. For example, a user may select one of the software applications. The advertising services software (e.g., SDK) is also initiated upon the initiation of the software application. The SDK may be associated with or embedded with the software application. The advertising services software may include or be associated with logic 242, an ad cache store 244, ad streaming functionality 246, and device functionality 248 of device 230. The initiated software application may have an ad play event for displaying or playing an ad on the display of the device. At operation 404, the device sends a configuration call to an ad server of an ad system upon the initiation of the advertising services software. At operation 406, the device receives a response that includes at least one configuration file from the ad system in response to the configuration call. The at least one configuration file includes different options (e.g., options 1-8 as described in conjunction with the description of FIG. 2) for obtaining at least one ad to play for an actual ad play event or a predicted ad play event that is predicted to occur in the future.

At operation 408, the device (or ad system) determines which option (e.g., 1-8) of the at least one configuration file will be processed or enabled for processing an ad request or a predictive ad request. At operation 410, prior to the actual ad event or predicted ad play event, the device sends an ad request (or a predictive ad request) with a configurable determined option (e.g., options 1-8, any available options) of the configuration file to the ad system (e.g., ad server of the ad system). The ad system (e.g., ad server of the ad system) processes the ad request (or predictive ad request) in order to determine an ad format and timing placement (e.g., an optimal ad format in terms of likelihood of converting, an optimal timing placement in terms of likelihood of converting) of at least one ad or interstitial ad played in-app based on the information contained in the predictive ad request or ad request.

At operation 412, the ad server, determines an ad placement referenced by the placement information in the ad request (or predictive ad request) based on application settings. At operation 414, the ad system (e.g., ad server of the ad system) checks for a match between ad placement under placement settings stored on the system or ad server with the ad placement referenced by the placement information in the ad request (or predictive ad request). At operation 416, if a match is determined, then the ad server determines placement assets (e.g., id matching, ad format, placement timing, ad content) that correspond to the placement information of the ad request or predictive ad request. The ad system (e.g., ad server of the ad system) includes an improved computer functionality that determines an ad format and timing placement that is most likely to convert, causes user interaction or user engagement, or generates revenue for a publisher or developer. At operation 418, if a match is not determined, then the system or ad server determines generic or default application settings for the selected application and applies these application settings to obtain an ad format and timing placement for at least one ad to be displayed within the selected application.

FIG. 5 illustrates a flow diagram of operations for a method of providing advertising services including ads or ad campaigns with a customized adaptive user experience including an adaptive decision unit in accordance with one embodiment.

The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, an ad system or ad server of the system performs the operations of method 500.

In one embodiment, a device initiates a software application. For example, a user may select one of the software applications. The advertising services software (e.g., SDK) is also initiated upon the initiation of the software application. The SDK may be associated with or embedded with the software application. The advertising services software may include or be associated with logic 242, an ad cache store 244, ad streaming functionality 246, and device functionality 248 of device 230. The initiated software application may have an ad play event for displaying or playing an ad on the display of the device. At operation 504, the ad system receives a configuration call from the device upon the initiation of the advertising services software. At operation 506, the ad system sends a response that includes at least one configuration file to the device in response to the configuration call. The at least one configuration file includes different options (e.g., options 1-8 as described in conjunction with the description of FIG. 2) for obtaining at least one ad to play for an actual ad play event or a predicted ad play event that is predicted to occur in the future.

At operation 508, the ad system (or device) determines which option (e.g., 1-8) of the response (e.g., at least one configuration file) will be processed or enabled for processing an ad request or a predictive ad request. At operation 510, prior to the actual ad event or predicted ad play event, the ad system receives an ad request (or a predictive ad request) with a configurable determined option (e.g., options 1-8, any available options) of the at least one configuration file from the device. At operation 512, the ad system (e.g., ad server of the ad system) processes the predictive ad request (or ad request) for determining an ad format and timing placement (e.g., an optimal ad format in terms of likelihood of converting, an optimal timing placement in terms of likelihood of converting) of at least one ad or interstitial ad played in-app based at least partially or primarily on the information contained in the predictive ad request or the ad request. The ad request includes different types of information including publisher settings (e.g., a publisher of the selected software application), an application id to identify the selected software application, placement information for timing placement of an ad in-app, user characteristics, device characteristics (e.g., device id, OS type, network connection for user's device, whether user's device is mobile device or tablet device, volume, screen size and orientation, language setting, etc.), geographical data, location data, motion data (e.g., motion data from an accelerometer or gyroscope), language, time, application settings, demographic data for the user of the device, session data (e.g., how long a user has been using the selected application for one or more sessions), and cache information (e.g., ads cached on device).

The ad format and targeting builder (e.g., ad format and targeting builder 208) allows a publisher or software developer to create a new custom ad format while targeting the ad for one or more user segments, perform testing of different ad formats or timing placements, and launch in app without leaving a UI (e.g., dashboard) provided by the system (e.g., system 201) or device. At operation 514, the system determines whether to select an opt-in ad interstitial or not based on information from the ad request, ad user data (e.g., other apps viewed or installed by the user, clicks, user profile, etc.) of the system, and third party user data if available. For example, an attributer may have a software component (e.g., SDK) of the publisher of the application installed on the user's device in order to obtain third party user data. This user data may include tracking of a user's interaction and engagement with the software application, a length of time that the application is installed, an amount of purchases from the application, and buying patterns in terms of which products or services are purchased and when these products or services are purchased. The user data may also include monitoring target goals for how the user engages with the application. For example, does a user reach a level in an appropriate amount of time or is the user taking too long to reach a level within an application. An opt-in interstitial provides a user the option of viewing the ad interstitial and may provide a reward in exchange for viewing the ad. An interstitial with no opt-in is forced onto the display of the user. The user has to view this interstitial.

At operation 516, for an opt-in interstitial, an adaptive decision unit (e.g., adaptive decision unit 211) utilizes at least one adaptive decision algorithm for taking into account numerous different variables (e.g., user ad engagement history, user app engagement history, user in-app purchase engagement history, user ad format engagement history, user ad placement engagement history, publishing application, location, volume settings, screen size, user demographic information, anonymous user information (e.g., clothes, vehicles, income), etc.) when making an ad decision (e.g., ad selection decision, ad placement decision) for obtaining a highly relevant ad or content served in an optimal engaging manner at an appropriate time for a user. The ad decision may include an appropriate placement of the opt-in ad interstitial in terms of an ad placement that is most likely to result in a conversion or cause user interaction with the opt-in ad interstitial.

In one embodiment, the adaptive decision unit utilizes at least two of user app engagement, user ad engagement history, and device information for making an ad decision and determining an optimal ad to be served in an engaging manner. In one example, the adaptive decision unit utilizes user app engagement, user ad engagement history, and device information. In another example, the adaptive decision unit utilizes user app engagement and user ad engagement history. In another example, the adaptive decision unit utilizes user app engagement and device information. In another example, the adaptive decision unit utilizes user ad engagement history and device information.

In one embodiment, the user app engagement may include a user's average session time, frequency, and history for using an application, the user in-app purchase engagement history, tutorial completion of an installed app, positive achievements in app, negative achievements in app, level of achievement in app, and any other parameter indicating a user's engagement with an application. The user app engagement may include whether a user is a new user or an existing user for the application and a level or degree of virality or influence for the user. For example, does the user share applications with friends or do friends install an application after the user has installed the application. The user ad engagement history indicates a user's engagement with an ad. For example, this parameter may indicate a profile for a user including whether a user has clicked on car ads in the past or not. The user ad engagement history can indicate whether an ad demo for an application has been viewed by the user and then converted into an installed application or not. The user ad engagement history parameter also tracks device attributes for when the user clicked on an ad and creative (e.g., ad colors, voice over or not for ad, end cards, etc.) for the ad. The user ad engagement history parameter indicates ad engagement for when the user replays the video ad, clicks on a call to action, ad session length, and historical ad engagement. The user ad engagement history parameter also indicates how a user responds to brand ad campaigns, performance ad campaigns, and types of ad categories (e.g., action games, strategy games, news content, sports games, sports content, etc.).

At operation 518, publisher settings of the selected application are applied for determining an ad format of the opt-in interstitial. The publisher settings determine a frame type, colors, icons, events, rewards, and images for selecting the ad format. The publisher settings can take into account the variables considered by the at least one adaptive decision algorithm for determining the ad format. At operation 520, advertiser settings are applied for determining or selecting an optimal ad. The advertiser settings may apply filters (e.g., rules), an optimizer, and a selector for a video ad, a start card (e.g., first user interface view for an ad), and an end card (e.g., last user interface view for the ad). Ad campaigns may also be selected at this time.

If no opt-in ad interstitial is selected at operation 514, then the method proceeds from operation 514 to operation 520 with an interstitial with no opt-in option or another ad type for the user is applied. At operation 520, advertiser settings are applied for determining the relevant optimal ad. For an interstitial with opt-in option, the optimal format is determined at operation 518. The selected ad is sent to the device for display on the device during an ad play event (or predicted ad play event) or obtained from the ad cache store of the device.

In a specific embodiment, different types of users playing a gaming application receive the same opt-in interstitial for a certain level within the gaming application. Embodiments of the present invention provide a dynamic user experience in which users A, B, and C each receive a completely different ad experience based on at least one parameter including past ad interaction, app engagement level, in-app purchase history, and emotional state for users A, B, and C. User A receives a first video ad with live action, full end card, a first reward and a first message content, User B receives a second video ad with a second reward and a second message content, and user C receives a third video ad with no reward. The different ad experiences are customized for each user to increase their interaction and engagement with the ad. The user experience is enhanced based on the user receiving ads targeted and customized for their interests. Developers, publishers, or advertisers can maximize revenue by serving desirable ads that users enjoy interacting and engaging with in-app for an initiated software application (e.g., initiated mobile software application).

In another embodiment, a newspaper publisher originally was providing a pay wall for all users of the newspaper application after a fifth piece of content was viewed by the user. Embodiments of the present invention provide a dynamic user experience in which user A receives a completely different ad experience than user B of the newspaper application based on past ad interaction, app engagement level, in-app purchase history, and emotional state for users A and B. For example, pay wall conversions and user enjoyment can be increased by targeting high engagement users (e.g., user A being a higher engagement user receives the pay wall while user B being a low engagement user does not receive the pay wall).

FIG. 6 illustrates a flow diagram of operations for a method of providing advertising services including ads or ad campaigns with a customized adaptive user experience in accordance with one embodiment. The advertising operational flow of an ad system may be executed by a device, apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, a device performs some or all operations of method 600.

In one embodiment, at operation 602, a device initiates a software application. For example, a user may select one of the software applications (e.g., selects a mobile application from a mobile device). The advertising services software (e.g., SDK) is also initiated upon the initiation of the software application. The SDK may be associated with or embedded with the software application. The advertising services software may include or be associated with logic 242, an ad cache store 244, ad streaming functionality 246, and device functionality 248 of device 230. The initiated software application may have an ad play event for displaying or playing an ad on the display of the device. At operation 604, the device sends a configuration call to an ad system upon the initiation of the advertising services software. At operation 606, the device receives a response that includes at least one configuration file from the ad system in response to the configuration call. The at least one configuration file includes different options (e.g., options 1-8 as described in conjunction with the description of FIG. 2) for obtaining at least one ad to play for an actual ad play event or a predicted ad play event that is predicted to occur in the future.

At operation 608, the device (or ad system) determines which option (e.g., 1-8) of the response (e.g., at least one configuration file) will be processed or enabled for processing an ad request or a predictive ad request. At operation 610, prior to the actual ad event or predicted ad play event, the device sends an ad request (or a predictive ad request) with a configurable determined option (e.g., options 1-8, any available options) of the at least one configuration file to the ad system. At operation 612, the device (or ad system) processes the predictive ad request (or ad request) for determining an ad format and timing placement (e.g., an optimal ad format in terms of likelihood of converting, an optimal timing placement in terms of likelihood of converting) of at least one ad or interstitial ad played in-app based at least partially or primarily on the information contained in the predictive ad request or the ad request. The ad request includes different types of information including publisher settings (e.g., a publisher of the selected software application), an application id to identify the selected software application, placement information for timing placement of an ad in-app, user characteristics, device characteristics (e.g., device id, OS type, network connection for user's device, whether user's device is mobile device or tablet device, volume, screen size and orientation, language setting, etc.), geographical data, location data, motion data (e.g., motion data from an accelerometer or gyroscope), language, time, application settings, demographic data for the user of the device, session data (e.g., how long a user has been using the selected application for one or more sessions), and cache information (e.g., ads cached on device).

The ad format and targeting builder (e.g., ad format and targeting builder 208) includes improved computer functionality to allow a publisher or software developer to create a new custom ad format while targeting the ad for one or more user segments, perform testing of different ad formats or timing placements, and launch in app without leaving a UI (e.g., dashboard) provided by the system (e.g., system 201) or device. At operation 514, the device (or system) determines whether to select an opt-in ad interstitial or not based on information from the ad request, ad user data (e.g., other apps viewed or installed by the user, clicks, user profile, etc.) of the system, and third party user data if available. For example, an attributer may have a SDK of the publisher of the application installed on the user's device in order to obtain third party user data. This user data may include tracking of a user's interaction and engagement with the software application, a length of time that the application is installed, an amount of purchases from the application, and buying patterns in terms of which products or services are purchased and when these products or services are purchased. The user data may also include monitoring target goals for how the user engages with the application. For example, does a user reach a level in an appropriate amount of time or is the user taking too long to reach a level within an application. An opt-in interstitial provides a user the option of viewing the ad interstitial and may provide a reward in exchange for viewing the ad. An interstitial with no opt-in is forced onto the display of the user. The user has to view this interstitial.

For an opt-in interstitial, an adaptive decision unit (e.g., adaptive decision unit 211) utilizes at least one adaptive decision algorithm for taking into account numerous different variables (e.g., user ad engagement history, user app engagement history, user in-app purchase engagement history, user ad format engagement history, user ad placement engagement history, publishing application, location, volume settings, screen size, user demographic information, anonymous user information (e.g., clothes, vehicles, income), etc.) when making an ad decision (e.g., ad selection decision, ad placement decision) for obtaining a highly relevant ad or content served in an optimal engaging manner at an appropriate time for a user. The ad decision may include an appropriate placement of the opt-in ad interstitial in terms of an ad placement that is most likely to result in a conversion or cause user interaction with the opt-in ad interstitial.

In one embodiment, the adaptive decision unit utilizes user app engagement, user ad engagement history, and device information. At operation 618, publisher settings of the selected application are applied for determining an ad format of the opt-in interstitial. The publisher settings determine a frame type, colors, icons, events, rewards, and images for selecting the ad format. The publisher settings can take into account the variables considered by the at least one adaptive decision algorithm for determining the ad format. At operation 620, advertiser settings are applied for determining an optimal ad. The advertiser settings may apply filters (e.g., rules), an optimizer, and a selector for a video ad, a start card (e.g., first user interface view for an ad), and an end card (e.g., last user interface view for the ad). Ad campaigns may also be selected at this time.

If no opt-in ad interstitial is selected at operation 614, then the method proceeds from operation 614 to operation 620 with an interstitial with no opt-in option or another ad type for the user being applied. At operation 620, advertiser settings are applied for determining the relevant optimal ad. For an interstitial with opt-in option, the optimal format is determined at operation 618. At operation 622, the device receives the selected ad for display on the device during an ad play event (or predicted ad play event) or the selected ad is obtained from the ad cache store of the device.

FIG. 7 illustrates a flow diagram of operations for a method of providing advertising services including ads or ad campaigns with a customized adaptive user experience including an ad format and targeting builder in accordance with one embodiment. The advertising operational flow of an ad system may be executed by an apparatus or system, which includes processing circuitry or processing logic. The processing logic may include hardware (circuitry, dedicated logic, etc.), software (such as is run on a general purpose computer system or a dedicated machine or a device), or a combination of both. In one embodiment, an ad system performs the operations of method 600.

In one embodiment, at operation 702, a format and targeting builder unit of the ad system includes an improved computer functionality for creating a customized ad format using custom scripting for ad campaigns. Placement information, variables considered by the at least one adaptive decision algorithm, and publisher settings of publishers may also be used for creating the customized ad format. At operation 704, the format and targeting builder unit of the ad system allows a user to edit ad formats. At operation 706, the format and targeting builder unit can be used to create target user segments based on ad format history of the users with a first category having levels of purchases for users with respect to one or more software applications, a second category having levels of loyalty for the users with respect to the one or more applications, a third category having levels of engagement for the users with respect to the one more software applications, and a fourth category having levels of skill for the users with respect to the one or more software applications.

In one embodiment, the levels of purchases for the first category include non-payers, payers, and highest payers and the levels of loyalty for the second category include new users, loyal users, and at risk users. The levels of engagement for the third category include high, medium, and low engagement users. The levels of skill for the fourth category include advanced, intermediate, and beginner users.

Different user segments are created based on the different levels for each category. For example, a first user segment may include highest payers, loyal users, high engagement users, and intermediate or advanced levels of skill for the users. A second user segment may include non-payers, new users or at risk users, low engagement users, and beginner users. A third user segment may include payers, loyal or at risk users, medium engagement users, and intermediate users. Different types of ad campaigns can be designed in a customized manner with improved functionality of the format and targeting builder unit depending on which user segment is being targeted.

The method further includes providing, with the format and targeting builder unit, support for frames for an ad, video size options including full screen and partial screen, video length options, and opt-in or autoplay ad options at operation 708.

The method further includes providing, with the format and targeting builder unit, skippable or forced ad options, muted, unmuted, or partial volume options, and portrait or landscape options for the user interface (UI) at operation 710. The method further includes providing, with the ad system, demand source options including hosted 1st party ad content, third party ad content, direct sold ads, ad exchange, programmatic brand ads, and programmatic performance ads at operation 712. The method further includes, at operation 714, providing, with the format and targeting builder unit, monetization options including video ad option, in-app purchase option, and no monetization mechanism determined by the system. For the video ad option and in-app purchase option, the system determines for a specific user which option will have a higher conversion rate for the video ad or in-app purchase and then selects the appropriate option having the higher conversion rate. The method further includes providing, with a dynamic rewards module, in-app purchase items and currency to users in exchange for watching ads at operation 716. The dynamic rewards module changes the reward offered to each user in a dynamic manner to maximize both ad and in-app purchase revenue. The reward may include different types of virtual currency or virtual goods (e.g., armor) and different amounts of virtual currency. Unlocking content (e.g., news content, music content), a raffle for movie tickets, and physical goods are other examples of rewards.

In some embodiments, the operations of the methods disclosed herein can be altered, modified, combined, or deleted. For example, the operations 512-518 can occur sequentially as illustrated in FIG. 5 or simultaneously in parallel (or approximately simultaneously) for the operations of method 500. For another example, the operations 602-614 can occur sequentially as illustrated in FIG. 6 or simultaneously in parallel (or approximately simultaneously) for the operations of method 600. Alternatively, the order of operation may be different than illustrated in FIG. 7. For example, the operation 706 may occur prior to operation 704. In another example, the operations 708-716 are provided at the same time or nearly the same time. The methods in embodiments of the present invention may be performed with an apparatus or data processing system as described herein. The apparatus or data processing system may be a conventional, general-purpose computer system or special purpose computers, which are designed or programmed to perform a limited number of advertising targeting and serving functions to client devices, may also be used.

Figure 8A:
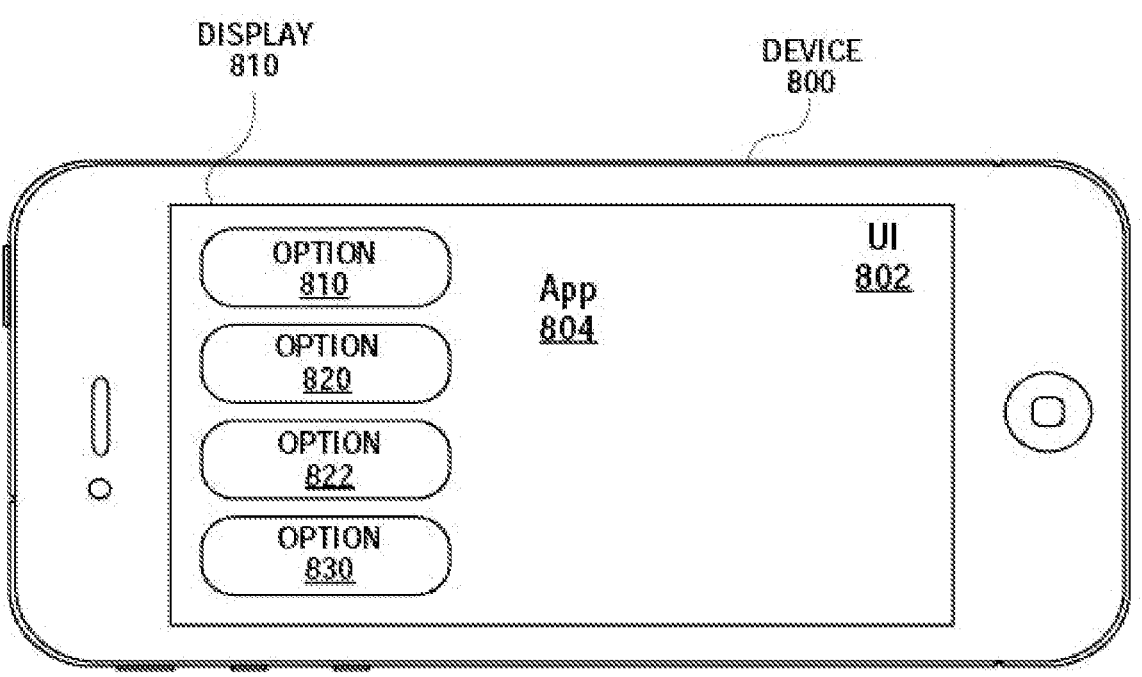
FIG. 8A illustrates an exemplary user interface for providing advertising services in accordance with one embodiment.

FIG. 8A illustrates an exemplary user interface for providing advertising services in accordance with one embodiment. A device 800 includes a display 810 to display the user interface 802 of a first software application (e.g., mobile software application, non-web browser mobile software application) which occurs after a user has initiated the first software application and has reached a temporary or natural stopping point (e.g., end of time limit for use of the first software application, a player or character of the user has died or has no energy within the first software application, etc.). The user interface 802 includes adaptive options that can be customized for a particular software application, for a particular level within a software gaming application, and for a particular user. The adaptive options 810, 820, 822, and 830 are customized to cause user interaction, engagement, and maximize revenue generated for the developer, advertiser, or publisher. In another example, only a subset of these adaptive options 810, 820, 822, and 830 are provided on the user interface 802. A selection of an adaptive option 810 allows a user to buy a virtual good, virtual currency, a physical item, or take an action (e.g., send a text message, send a message on a social media site, etc.). The user may then be allowed to continue using features of the first software application based on buying a virtual good, virtual currency, a physical item, or taking an action. A selection of an adaptive option 820 allows a user to watch an advertisement (e.g., video ad) in exchange for allowing the user to continue use of the first software application.

Figure 8B:
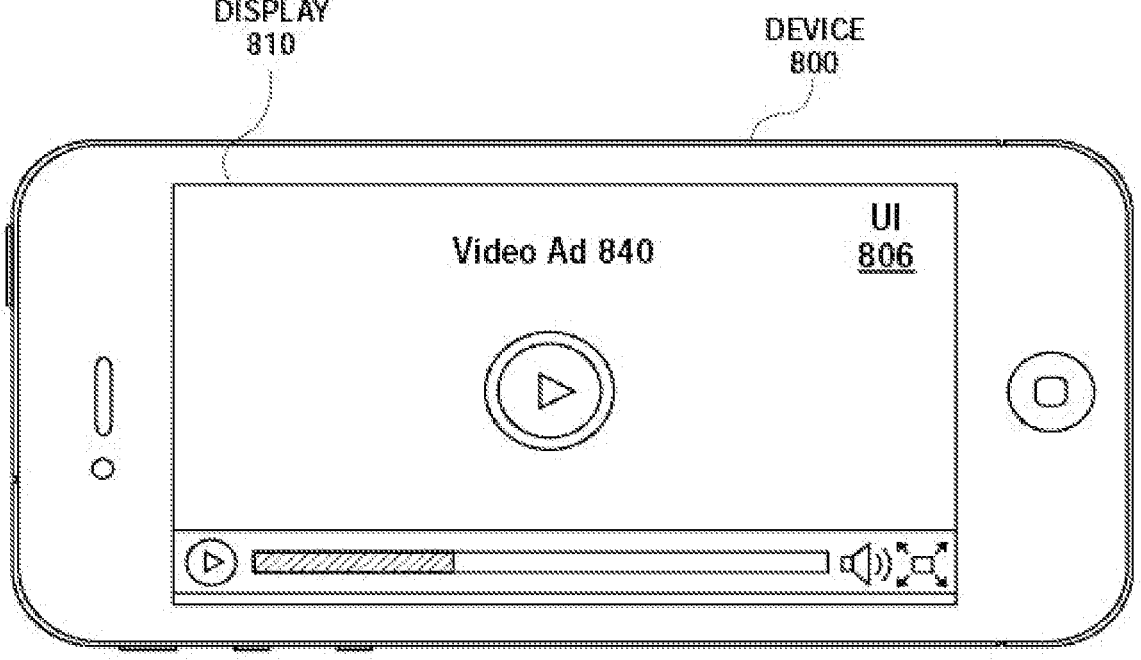
FIG. 8B illustrates an exemplary user interface of a video ad within an initiated first software application in accordance with one embodiment.

FIG. 8B illustrates an exemplary user interface of a video ad within an initiated first software application in accordance with one embodiment. The device 800 includes the display 810 for displaying a user interface (UI) 806 having a video ad 840 within the initiated first software application (e.g., mobile application, non-web browser application) of the device 800. The video ad is advertising a product or service (e.g., advertising features of a second software application).

Figure 8C:
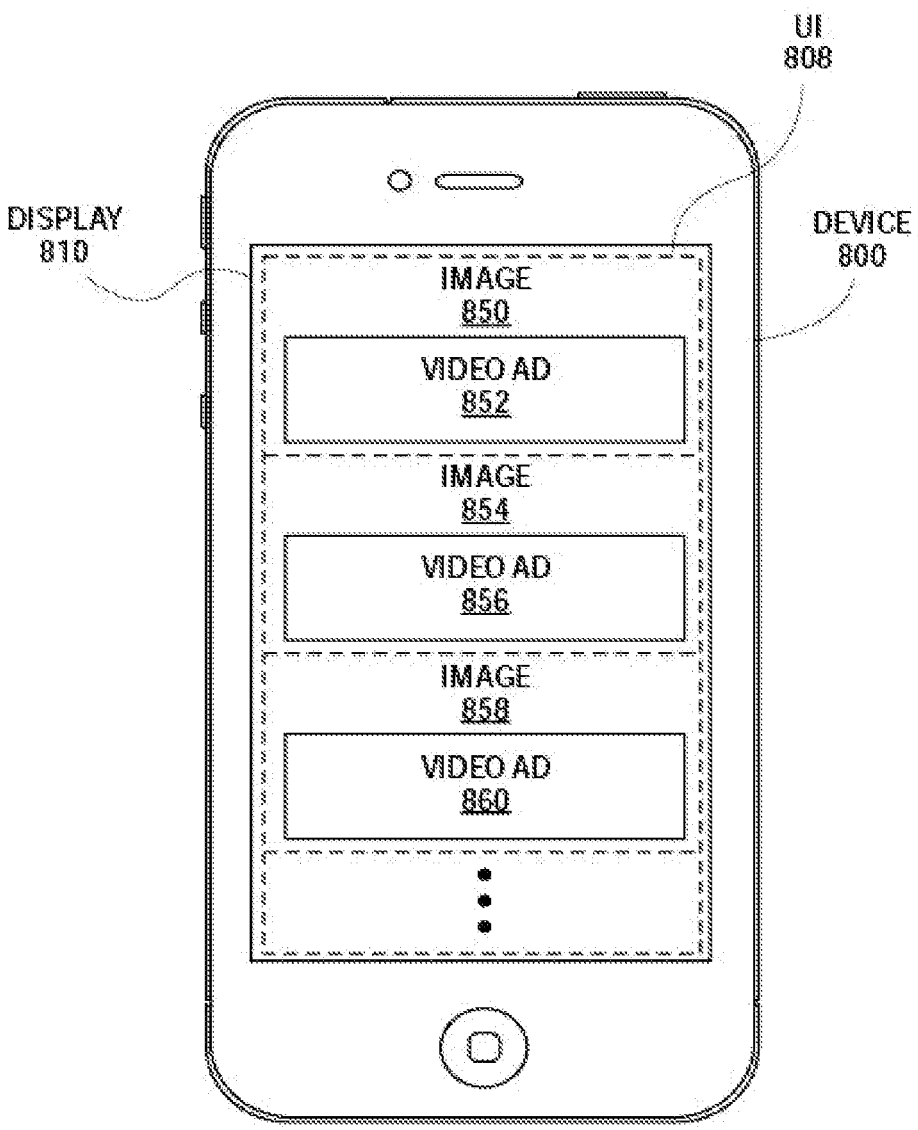
FIG. 8C illustrates an exemplary user interface for promoting different products or services with different video ads in accordance with one embodiment.
Figure 8D:
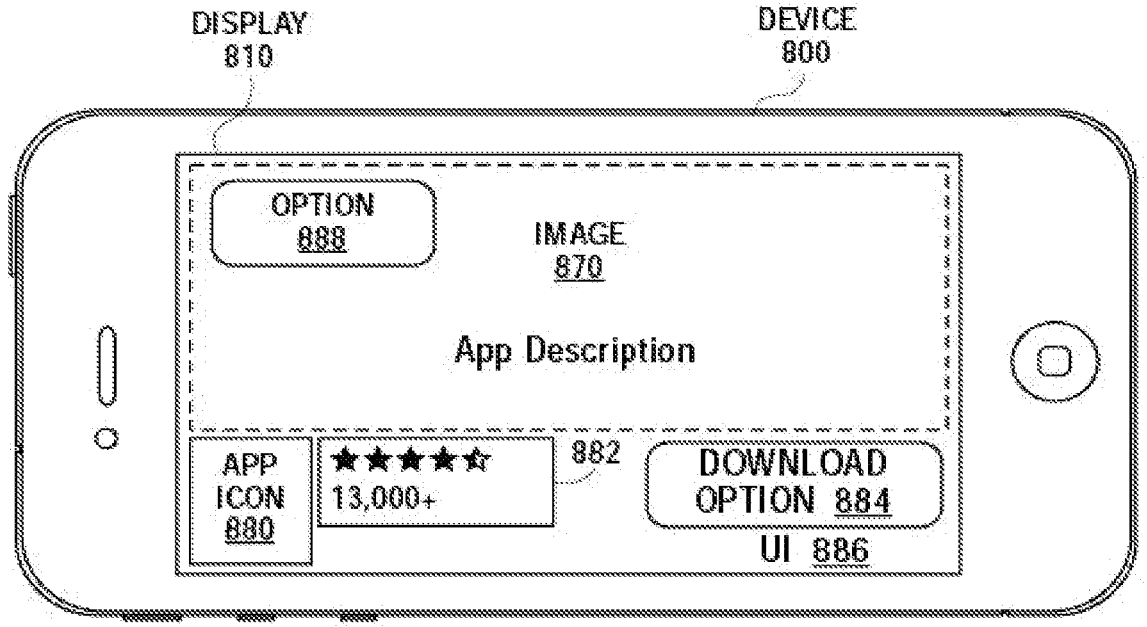
FIG. 8D illustrates an exemplary user interface (UI) that includes at least one of a description and an image of a product or service (e.g., app description) for a second software application in accordance with one embodiment.

After the video ad 840 plays partially or completely depending on a setting (e.g., placement settings, application settings, publisher settings, adaptive decision algorithm, etc.), the display 810 of the device 800 displays a user interface (UI) 886 as illustrated in FIG. 8D in accordance with one embodiment that includes at least one of a description and an image of the product or service (e.g., app description) for the second software application. The user interface 886 includes a download option 884 for downloading the second software application. The UI 886 may also include other information related to the second software application including an icon region 880 for displaying an icon of the second software application and a ratings region 882 for displaying a ratings level (e.g., star level) and a number of user reviews for the ratings level. In this manner, a user can more easily be targeted for the video ad 840 of the second software application and also obtain the second software application. The user can download the second software application or return to the first software application by dismissing the user interface 886 or by selecting an option 888.

A selection of an adaptive option 822 of UI 802 of FIG. 8A allows a user to select at least one advertisement (e.g., video ad) from a list as illustrated in FIG. 8C or a presentation of video ads in exchange for allowing the user to continue use of the first software application.

FIG. 8C illustrates an exemplary user interface for promoting different products or services with different video ads in accordance with one embodiment. The display 810 of the device 800 displays a user interface (UI) 808 that includes a plurality of video ads or a plurality of images of the product or service (e.g., app image) and associated video ads for the images. The UI 808 is generated in response to the selection of the adaptive option 822. In one example, the user interface 808 includes an image 850 and a video ad 852 for promoting a product or service (e.g., second software application). The user interface 808 includes an image 854 and a video ad 856 for promoting a product or service (e.g., third software application). The user interface 808 also includes an image 858 and a video ad 860 for promoting a product or service (e.g., third software application). Additionally images and video ads may also be included on the user interface 808 or may be viewed by scrolling the user interface. In another example, an app icon and associated video ad is displayed on the user interface for a plurality of products or services. Upon a user selection, at least one of the video ads plays partially or completely and depending on a setting (e.g., placement settings, application settings, publisher settings, adaptive decision, algorithm, etc.), the display 810 of the device 800 displays a user interface (e.g., UI 886, UI 890) that includes a description or image of the product or service that is being promoted by a selected video ad.

Figure 8E:
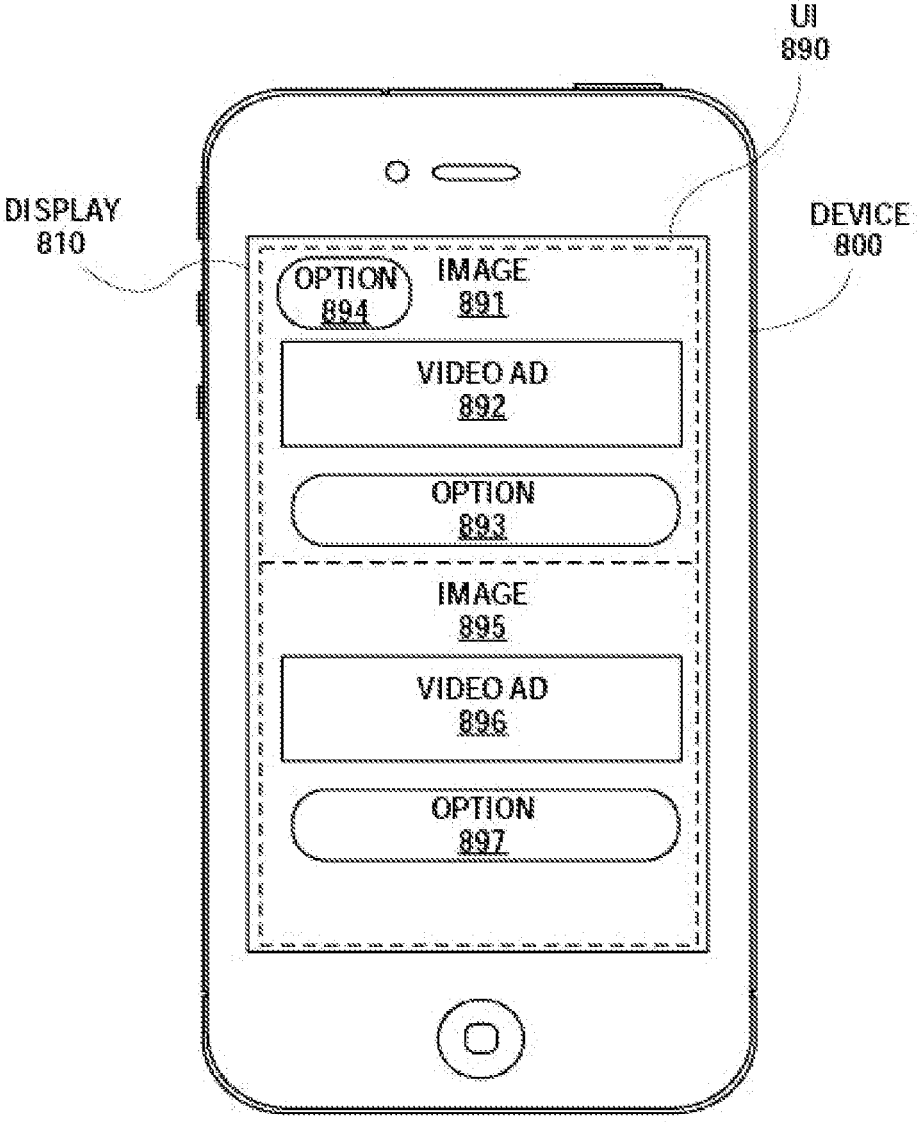
FIG. 8E illustrates an exemplary user interface for promoting different products or services in accordance with one embodiment.

FIG. 8E illustrates an exemplary user interface for promoting different products or services in accordance with one embodiment. After a video ad (e.g., the video ad 852, 856, or 860) within a first software application (e.g., mobile application, non-web browser application) plays partially or completely, the display 810 of the device 800 displays the user interface (UI) 890 that includes an image 891 of the product or service (e.g., app image) of the selected video ad in a background of the UI 890. In the foreground, the user interface 890 includes a video ad 892 if the user wants to replay a previously selected video ad (e.g., video ad 852, 856, or 860) and a download option 893 for downloading the product or service (e.g., software application) associated with the selected video ad from within the first software application.

The user interface (UI) 890 may optionally include an image 895 of a product or service (e.g., app image) of a non-selected video ad (e.g., video ad 852, 856, 860) in a background of the UI 890. In the foreground, the user interface 890 may optionally include a video ad 896 associated with the image 895 if the user wants to play a previously non-selected video ad 896 (e.g., video ad 852, 856, or 860) and a download option 897 for downloading the product or service (e.g., software application) associated with the video ad 896 from within the first software application.

A selection of an adaptive option 830 from FIG. 8A allows a user to skip or bypass the advertising services of the user interface 800 and return to using the first software application.

Figure 9:
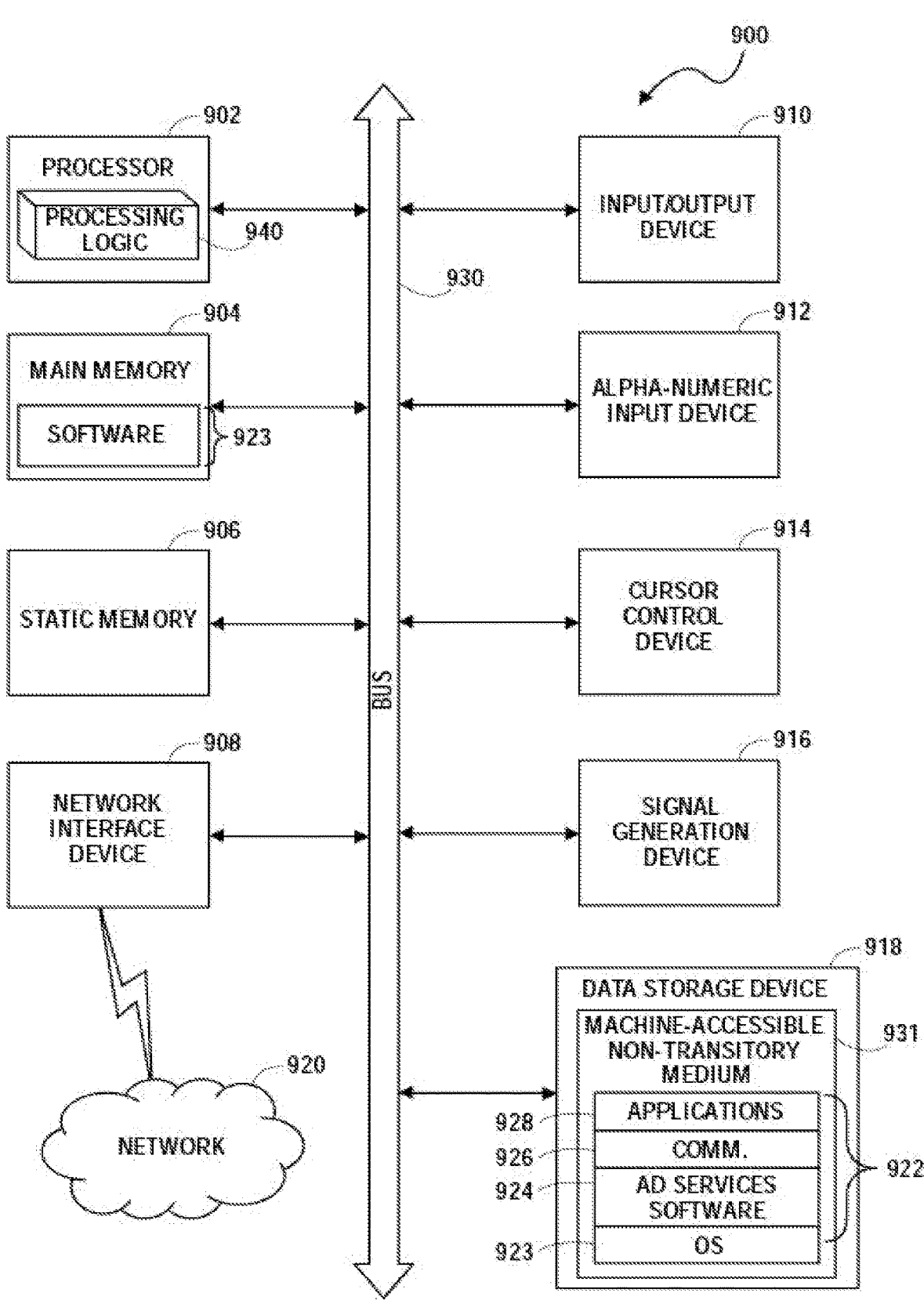
FIG. 9 illustrates a diagrammatic representation of a machine in the exemplary form of a device 900 within which a set of instructions, for causing the machine to perform any one or more of the methodologies discussed herein, may be executed in accordance with one embodiment.

FIG. 9 illustrates a diagrammatic representation of a machine in the exemplary form of a computer system or device 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a mobile device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary device 900 includes a processing device (processor) 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processor 902 represents one or more general-purpose processing devices such as one or more microprocessors, central processing units, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute the processing logic 926 for performing the operations and steps discussed herein.

The device 900 may further include a network interface device 908 that may include RF circuitry for sending and receiving RF cellular signals, a wireless transceiver for WiFi, a USB component, a NFC component, or any other communications component for sending and receiving communications. The device 900 also may include an input/output device 910 (e.g., a display, a liquid crystal display (LCD), a plasma display, a cathode ray tube (CRT), touch display device, or touch screen for receiving user input and displaying output), an optional alphanumeric input device 912 (e.g., a keyboard), an optional cursor control device 914 (e.g., a mouse), and a signal generation device 916 (e.g., a speaker).

The data storage device 918 may include a machine-accessible non-transitory medium 931 on which is stored one or more sets of instructions (e.g., software 922) embodying any one or more of the methodologies or functions described herein. The software 922 may include an operating system 923, advertising services software 924 (e.g., SDK 924), communications module 926, and applications 928 (e.g., publisher applications). The software 922 may also reside, completely or at least partially, within the main memory 904 (e.g., software 923) and/or within the processor 902 during execution thereof by the device 900, the main memory 904 and the processor 902 also constituting machine-accessible storage media. The software 922 or 923 may further be transmitted or received over a network 920 via the network interface device 908.

The machine-accessible non-transitory medium 931 may also be used to store data structure sets that define user identifying states and user preferences that define user profiles. Data structure sets and user profiles may also be stored in other sections of device 900, such as static memory 906.

Figure 10:
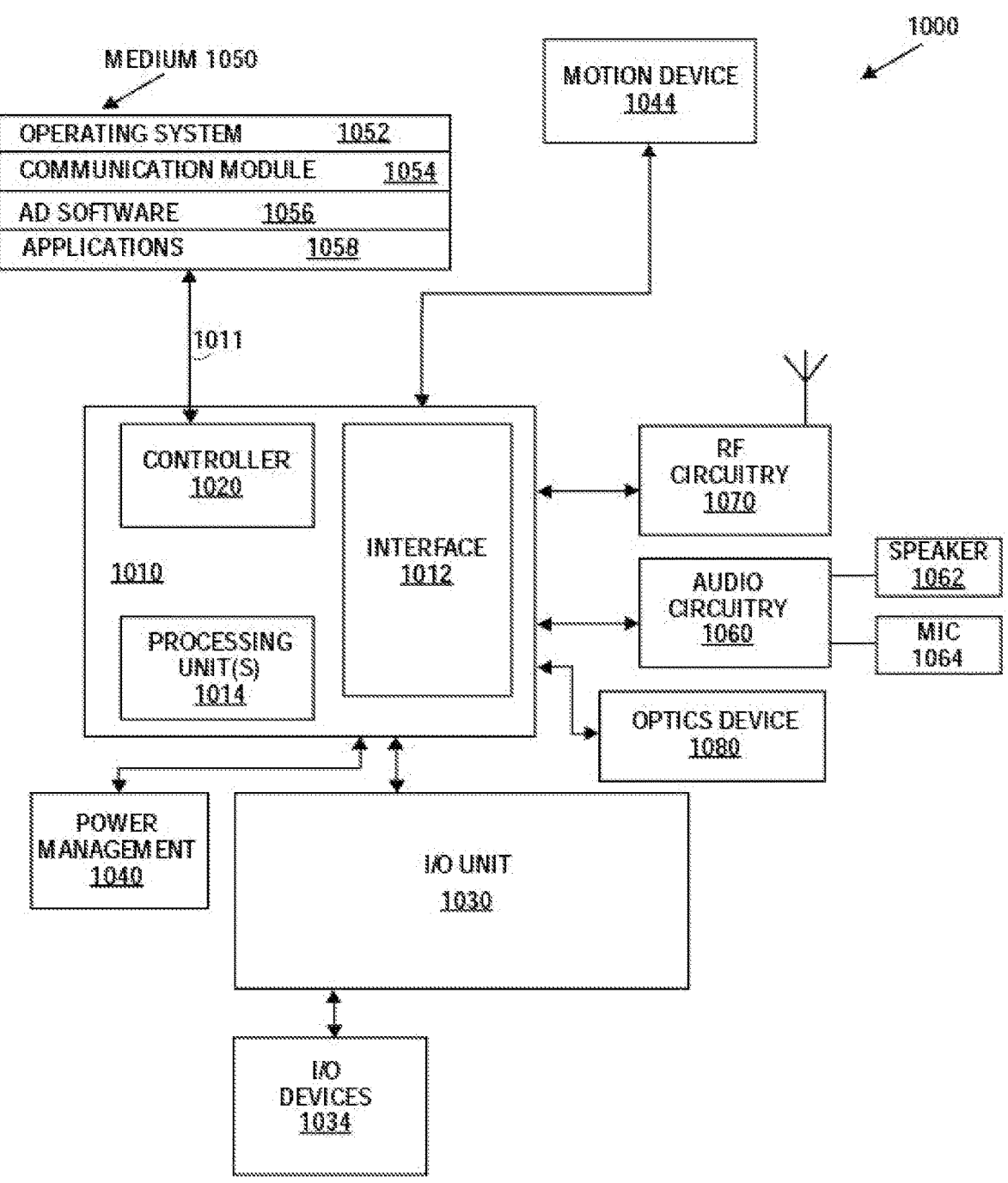
FIG. 10 is a block diagram of a wireless device 1000 in accordance with one embodiment.

FIG. 10 is a block diagram of a wireless device 1000 in accordance with one embodiment. The wireless device 1000 may be any type of wireless device (e.g., cellular phone, wireless phone, tablet, etc.) for sending and receiving wireless communications. The wireless device includes a processing system 1010 that includes a controller 1020 and processing units 1014, which may include processing logic. The processing system 1010 communicates with an Input/Output (I/O) unit 1030, radio frequency (RF) circuitry 1070, audio circuitry 1060, an optics device 1060 for capturing one or more images or video, a motion device (e.g., an accelerometer, gyroscope, etc.) for determining motion data (e.g., in three dimensions) for the wireless device 1000, power management system 1040, and machine-accessible non-transitory medium 1050. These components are coupled by one or more communication links or signal lines.

RF circuitry 1070 is used to send and receive information over a wireless link or network to one or more other devices. Audio circuitry 1060 is coupled to audio speaker 1062 and microphone 1064 and includes known circuitry for processing voice signals.

One or more processing units 1014 communicate with one or more machine-accessible non-transitory mediums 1050 (e.g., computer-readable medium) via controller 1020. Medium 1050 can be any device or medium (e.g., storage device, storage medium) that can store code and/or data for use by one or more processing units 1014. Medium 1050 can include a memory hierarchy, including but not limited to cache, main memory and secondary memory. The medium 1050 stores one or more sets of instructions (or software) embodying any one or more of the methodologies or functions described herein. The software may include an operating system 1052, advertising services software 1056 (e.g., SDK 1056), communications module 1054, and applications 1058 (e.g., publisher applications, developer applications, a web browser, html5 applications, etc.). The software may also reside, completely or at least partially, within the medium 1050 or within the processing units 1014 during execution thereof by the device 1000. The components shown in FIG. 10 may be implemented in hardware, software, firmware or any combination thereof, including one or more signal processing and/or application specific integrated circuits.

Communication module 1054 enables communication with other devices. The I/O unit 1030 communicates with different types of input/output (I/O) devices 1034 (e.g., a display, a liquid crystal display (LCD), a plasma display, a cathode ray tube (CRT), touch display device, or touch screen for receiving user input and displaying output, an optional alphanumeric input device).

In one embodiment, a machine-accessible non-transitory medium contains executable computer program instructions which when executed by a data processing system cause the system to perform any of the methods discussed herein. While the machine-accessible non-transitory medium 1050 is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present invention. The term "machine-accessible non-transitory medium" shall accordingly be taken to include, but not be limited to, solid-state memories, optical and magnetic media, and carrier wave signals.

In one embodiment, a system includes a storage medium to store one or more software programs and an adaptive decision unit coupled to the storage medium. The adaptive decision unit including or being coupled to processing logic that is configured to execute instructions of at least one adaptive decision algorithm to obtain data for a plurality of different variables including at least two of an advertisement (ad) engagement history for a user, application (app) engagement history for the user, and in-app purchase engagement history for the user when making an ad selection decision. The processing logic is configured to execute instructions of at least one adaptive decision algorithm to determine an ad selection decision for at least one relevant ad or ad content served in an engaging manner to a device of the user based on the data of the plurality of different variables for the ad selection decision. The plurality of different variables further includes ad format engagement history for the user, ad placement engagement history for the user, publishing application, location, volume settings, and screen size of the device.

The system includes a testing platform to allow publishers or developers to perform multiple concurrent tests on different ad formats and placements to determine which test has optimal results in terms of at least one of revenue, conversions, and positive reviews. In one example, the data is obtained from a first party database that includes ad user data including other apps viewed or installed by the user, clicks, user profile, and device profile. In another example, the data is obtained from a third party database that includes ad user data for tracking of a user's interaction and engagement with a software application of the user, a length of time that the software application is installed, an amount of purchases from the software application, and buying patterns in terms of which products or services are purchased and when these products or services are purchased.

In one embodiment, a machine-accessible non-transitory medium containing executable computer program instructions which when executed by a data processing system cause said system to perform a method. The method includes obtaining data associated with a plurality of different variables including at least two of an advertisement (ad) engagement history for a user, application (app) engagement history for the user, and in-app purchase engagement history for the user when making an ad selection decision; and determining an ad selection decision of at least one relevant ad or ad content served in an engaging manner to a device of the user based on the data of the plurality of different variables for the ad selection decision.

In one example, the plurality of different variables further includes ad format engagement history for the user. The plurality of different variables may further include ad placement engagement history for the user. In one example, the plurality of different variables further includes publishing application, location, volume settings, and screen size of the device.

In one embodiment, the method further includes performing, with a testing platform, multiple concurrent tests on different ad formats and placements to determine which test has optimal results in terms of at least one of user interaction, user engagement, revenue, conversions, and positive reviews.

In one embodiment, the data is obtained from a first party database that includes ad user data including other apps viewed or installed by the user, clicks, user profile, and device profile. In another example, the data is obtained from a third party database that includes ad user data for tracking of a user's interaction and engagement with a software application of the user, a length of time that the software application is installed, an amount of purchases from the software application, and buying patterns in terms of which products or services are purchased and when these products or services are purchased.

In one embodiment, the method further includes applying publisher settings to determine an ad format of the at least one relevant ad or ad content including an opt-in ad interstitial. The publisher settings determine a frame type, colors, icons, events, rewards, and images for selecting the ad format.

In one embodiment a method includes obtaining data associated with a plurality of different variables including at least two of an advertisement (ad) engagement history for a user, application (app) engagement history for the user, and in-app purchase engagement history for the user when making an ad selection decision. The method also includes determining the ad selection decision of at least one relevant ad or ad content served in an engaging manner to a device of the user based on the data of the plurality of different variables for the ad selection decision.

In one example, the plurality of different variables further includes ad format engagement history for the user. The plurality of different variables may also include ad placement engagement history for the user. The plurality of different variables further includes publishing application, location, volume settings, and screen size of the device. The method further includes performing, with a testing platform, multiple concurrent tests on different ad formats and placements to determine which test has optimal results in terms of at least one of user engagement, user interaction, revenue, conversions, and positive reviews.

In one example, the data is obtained from a first party database that includes ad user data including other apps viewed or installed by the user, clicks, user profile, and device profile. The data may also be obtained from a third party database that includes ad user data for tracking of a user's interaction and engagement with a software application of the user, a length of time that the software application is installed, an amount of purchases from the software application, and buying patterns in terms of which products or services are purchased and when these products or services are purchased.

In one embodiment, the method further includes applying publisher settings to determine an ad format of an opt-in interstitial. The publisher settings determine a frame type, colors, icons, events, rewards, and images for selecting the ad format.

In one embodiment, a device (e.g., device 230, device 900, device 1000) includes a storage medium (e.g., medium 931, medium 1050) to store one or more software programs, a user interface (UI) to display adaptive customizable ads on the device, and processing logic (processing logic 940, processing logic of processing unit(s) 1014) coupled to the storage medium. The processing logic is configured to execute instructions of at least one software program to initiate a software application and associated advertising services software (e.g., ad services software 240, ad services software 924, ad software 1056) on the device, generate, with the device, an ad request in response to the initiation of the software application and associated advertising services software. The advertising services software obtains data for a plurality of different variables including at least two of an advertisement (ad) engagement history for a user of the device, application (app) engagement history for the user, and in-app purchase engagement history for the user that are included in the ad request. The processing logic is configured to execute instructions of at least one software program to send the ad request to an ad system and to receive a customized adaptive ad based on the data for the plurality of different variables that are included in the ad request.

In one embodiment, the processing logic further is configured to execute instructions of at least one software program to determine an ad selection decision for at least one relevant ad or ad content provided in an engaging manner to the device of the user based on the data of the plurality of different variables for the ad selection decision. In one example, the plurality of different variables further includes ad format engagement history for the user, publishing application, location, volume settings, and screen size of the device.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer implemented method of providing adaptive options on a wireless device, the computer implemented method comprising:

displaying a user interface of a first software application on the wireless device in response to a user initiating the first software application;

generating, with processing logic including at least one hardware processor, selectable adaptive options that are customized based on the first software application, device characteristics of the wireless device of the user including an operating system type, and a user profile of the user to cause user interaction and engagement; and updating, with the processing logic, the user interface to display the selectable adaptive options in response to reaching a temporary or natural stopping point including reaching an end of time limit for use of the first software application or a player or character has been terminated for the first software application, wherein the selectable adaptive options include:

a first adaptive option to allow a user action of making a purchase or sending a message, a second adaptive option to display a video ad within the first software application and enable continue use of the first software application after completion of the video, and a third adaptive option to skip or bypass the video ad and enable limited use of the first software application.

2. The computer implemented method of claim 1, wherein the adaptive options are customized for a particular level within the first software application.

3. The computer implemented method of claim 1, further comprising:

receiving a selection of the first adaptive option to allow the user action to buy a virtual good, virtual currency, a physical item, or take an action including sending a message.

4. The computer implemented method of claim 3, further comprising:

providing continued access to the first software application based on buying a virtual good, virtual currency, a physical item, or taking an action.

5. The computer implemented method of claim 1, further comprising:

upon the video ad playing partially or completely depending on a setting, updating the user interface to provide a download option to download the second software application and a description and an image of a product or service for the second software application.

6. The computer implemented method of claim 5, wherein the updated user interface includes other information related to the second software application including an icon region for displaying an icon of the second software application, a ratings region for displaying a ratings level, and a number of user reviews for the ratings level.

7. The computer implemented method of claim 1, further comprising:

receiving a selection of a fourth adaptive option to allow the user to view and select from a list of video ads.

8. A machine-accessible non-transitory medium containing executable computer program instructions which when executed by a wireless device cause said wireless device to perform a method of providing adaptive options, the method comprising:

displaying a user interface of a first software application on the wireless device in response to a user initiating the first software application;

generating, with processing logic including at least one hardware processor, selectable adaptive options that are customized based on the first software application, device characteristics of the wireless device of the user including an operating system type, and a user profile of the user to cause user interaction and engagement; and updating, with the processing logic, the user interface to display the selectable adaptive options in response to reaching a temporary or natural stopping point including reaching an end of time limit for use of the first software application or a player or character has been terminated for the first software application, wherein the selectable adaptive options include:

a first adaptive option to allow a user action of making a purchase or sending a message, a second adaptive option to display a video ad within the first software application and enable continue use of the first software application after completion of the video, and a third adaptive option to skip or bypass the video ad and enable limited use of the first software application.

9. The machine-accessible non-transitory medium of claim 8, wherein the adaptive options are customized for a particular level within the first software application.

10. The machine-accessible non-transitory medium of claim 9, the method further comprising:

receiving a selection of the first adaptive option to allow the user action to buy a virtual good, virtual currency, a physical item, or take an action including sending a message.

11. The machine-accessible non-transitory medium of claim 10, the method further comprising:

providing continued access to the first software application based on buying a virtual good, virtual currency, a physical item, or taking an action.

12. The machine-accessible non-transitory medium of claim 8, the method further comprising:

upon the video ad playing partially or completely depending on a setting, updating the user interface to provide a download option to download the second software application and a description and an image of a product or service for the second software application.

13. The machine-accessible non-transitory medium of claim 12, wherein the updated user interface includes other information related to the second software application including an icon region for displaying an icon of the second software application, a ratings region for displaying a ratings level, and a number of user reviews for the ratings level.

14. The machine-accessible non-transitory medium of claim 8, the method further comprising:

receiving a selection of a fourth adaptive option to allow the user to view and select from a list of video ads.

15. A wireless device, comprising:

a storage medium to store one or more software programs and customizable ads;

a user interface (UI) to display adaptive customizable ads on the wireless device; and processing logic coupled to the storage medium, the processing logic including at least one hardware processor is configured to execute instructions of at least one software program to:

initiate a first software application and associated advertising services software on the wireless device;

generate, with the processing logic including at least one hardware processor, selectable adaptive options that are customized based on the first software application, device characteristics of the wireless device of the user including an operating system type, and a user profile of the user to cause user interaction and engagement; and update, with the processing logic, the user interface to display the selectable adaptive options in response to reaching a temporary or natural stopping point including reaching an end of time limit for use of the first software application or a player or character has been terminated for the first software application, wherein the selectable adaptive options include a first adaptive option to allow a user action of making a purchase or sending a message, a second adaptive option to display a video ad within the first software application and enable continue use of the first software application after completion of the video, and a third adaptive option to skip or bypass the video ad and enable limited use of the first software application.

16. The wireless device of claim 15, wherein the adaptive options are customized for a particular level within the first software application.

17. The wireless device of claim 15, wherein the processing logic is configured to execute instructions of at least one software program to:

receive a selection of the first adaptive option to allow the user action to buy a virtual good, virtual currency, a physical item, or take an action including sending a message; and provide continued access to the first software application based on buying a virtual good, virtual currency, a physical item, or taking an action.

18. A computer implemented method, comprising:

on a user device, monitoring interaction with a first software application to detect a temporary or natural stopping point characterized by the absence of active input for at least a threshold interval defined by an adaptive decision algorithm;

responsive to the detection, generating on the user device a set of selectable adaptive options that are personalized to the first software application and the user based on multi-variable data comprising application context signals and user behavior signals; and updating a user interface of the first software application to insert the set of selectable adaptive options at the stopping point to drive in-application engagement.

19. The computer implemented method of claim 18, wherein the set of selectable adaptive options include:

a first adaptive option to allow a user action of making a purchase or sending a message, a second adaptive option to display a video ad within the first software application and enable continue use of the first software application after completion of the video, and a third adaptive option to skip or bypass the video ad and enable limited use of the first software application.

20. The computer implemented method of claim 19, further comprising:

receiving a selection of the first adaptive option to allow the user action to buy a virtual good, virtual currency, a physical item, or take an action including sending a message.

21. A computer implemented method performed with a wireless device, comprising:

executing a first software application that presents a user interface;

maintaining, by an adaptive decision unit executing locally on the device, a plurality of variable values derived from at least current session context and prior session interaction patterns of the user with the first software application;

at runtime, generating a selectable adaptive option set customized for the first software application and the user by applying an adaptive decision algorithm to the plurality of variable values; and updating the user interface to present the selectable adaptive option set when the adaptive decision unit determines that a temporary or natural stopping point has occurred in the user's interaction with the first software application.

22. The computer implemented method of claim 21, wherein the set of selectable adaptive options include:

a first adaptive option to allow a user action of making a purchase or sending a message, a second adaptive option to display a video ad within the first software application and enable continue use of the first software application after completion of the video, and a third adaptive option to skip or bypass the video ad and enable limited use of the first software application.

23. The computer implemented method of claim 22, further comprising:

receiving a selection of the first adaptive option to allow the user action to buy a virtual good, virtual currency, a physical item, or take an action including sending a message.

* * * * *